US005903597A

United States Patent [19]
Pon

[11] Patent Number: 5,903,597
[45] Date of Patent: May 11, 1999

[54] SUPPRESSION ON MULTIPATH SIGNAL EFFECTS

[75] Inventor: Rayman Pon, Cupertino, Calif.

[73] Assignee: Trimble Navigation Limited, Sunnyvale, Calif.

[21] Appl. No.: 08/650,631

[22] Filed: May 20, 1996

[51] Int. Cl.$^6$ .............................. H04K 1/00; H04L 1/02
[52] U.S. Cl. .................. 375/209; 375/343; 375/347
[58] Field of Search .................................. 375/209, 346, 375/285, 267, 347, 343; 342/378; 364/728.03, 728.07

[56] References Cited

U.S. PATENT DOCUMENTS

| | | |
|---|---|---|
| 4,007,330 | 2/1977 | Winters . |
| 4,168,529 | 9/1979 | Tomlinson . |
| 4,203,070 | 5/1980 | Bowles et al. . |
| 4,203,071 | 5/1980 | Bowles et al. . |
| 4,550,414 | 10/1985 | Guignon et al. . |
| 4,608,569 | 8/1986 | Dickey et al. . |
| 4,660,164 | 4/1987 | Liebowitz . |
| 4,737,928 | 4/1988 | Parl et al. ............................ 364/802 |
| 4,829,543 | 5/1989 | Borth et al. . |
| 4,862,478 | 8/1989 | McIntosh . |
| 5,091,918 | 2/1992 | Wales . |
| 5,101,416 | 3/1992 | Fenton et al. ........................ 375/1 |
| 5,164,959 | 11/1992 | Cai et al. . |
| 5,282,228 | 1/1994 | Scott et al. ............................ 375/97 |
| 5,347,536 | 9/1994 | Meehan .................................. 375/1 |
| 5,390,207 | 2/1995 | Fenton et al. ........................ 375/1 |
| 5,402,450 | 3/1995 | Lennen ................................ 375/343 |
| 5,414,729 | 5/1995 | Fenton et al. ..................... 375/209 |
| 5,444,451 | 8/1995 | Johnson et al. . |
| 5,481,503 | 1/1996 | Kuhn et al. . |
| 5,488,662 | 1/1996 | Fox et al. . |
| 5,493,588 | 2/1996 | Lennen ................................ 375/343 |
| 5,495,499 | 2/1996 | Fenton et al. ..................... 375/205 |
| 5,715,236 | 2/1998 | Gilhousen et al. ................ 375/206 |

OTHER PUBLICATIONS

R.E. Ziemer & R.L. Peterson, *Digital Communications and Spread Spectrum Systems*, Macmillan Publ. Co., New York, 1985, pp. 419–447.
Alfred Leick, *GPS Satellite Surveying*, John Wiley & Sons, New York, 2cd Ed., 1995 and Ziemer and Peterson, op. cit.
W.M. Bowles, "Correlation Tracking", Charles Stark Draper Laboratory, May–80.

*Primary Examiner*—Tesfaldet Bocure
*Attorney, Agent, or Firm*—John F. Schipper

[57] ABSTRACT

Method and apparatus for formation of an autocorrelation difference function of an incoming digital signal, with bit transition interval $\lambda\tau_{chip}$, that reduces the effects of presence of a multipath signal in an incoming composite signal. First and second autocorrelation functions $AC(\tau;E;qE)$ and $AC(\tau;L;qL)$ are formed with respective first and second selected time shift values $\tau=t_E$ and $\tau=t_L$, which replicate an estimate of an autocorrelation function $AC(\tau;P;qP)$ at an intermediate time shift value $\tau=t_P$ that satisfies $t_E<t_P<t_L$ with $t_L-t_E<2\ \Delta\tau_{chip}$, and which depend upon one or more parameters $qE$ and $qL$, respectively. Independently chosen, non-uniform weighting functions $w1(t;qE)$ and $w2(t;qL)$ are used for formation of the respective autocorrelation functions $AC(\tau;E;qE)$ and $AC(\tau;L;qL)$ that depend upon one or more parameters $qE$ and $qL$. Reduction of non-multipath and/or noise effects is achieved by particular choices of weighting functions. The correlator spacing $t_L-t_E$ may be narrow (e.g., $\Delta t_{L-E} \leq 0.3\Delta\tau_{chip}$) or may be any larger value, up to $2\Delta\tau_{chip}$, with appropriate choice of the weighting functions w1 and w2.

44 Claims, 24 Drawing Sheets

SUPPRESSION ON MULTIPATH SIGNAL EFFECTS

FIELD OF THE INVENTION

This invention relates to a method for minimizing the deleterious effects of multipath on incoming digital spread spectrum signals that are encountered in signal receivers.

BACKGROUND OF THE INVENTION

The effects of multipath are well known in communications systems.

Multipath is the term used to define the secondary signals that are locally induced reflections of a primary signal that enter the receiver in question a fraction of a second later than the direct path signal, and because of the relatively short delay between the original signal and the secondary signal, induce a type of destructive interference that results in some type of impairment to the desired signal. In analog FM band automobile receivers, the effects of multipath create an annoying flutter that causes a loss of intelligibility. In television signals, the impairment is called a "ghost" image. A similar impairment occurs in other forms of analog communication. In digital systems, whether for speech or for data transmission for other purposes, multipath basically adds noise to the desired signal, resulting in either outright errors or at least, much noisier data. In spread spectrum receivers, the effects of multipath are generally found in the correlators used to achieve signal timing synchronization. In GPS or GLONASS receivers, which seek to determine location based on triangulation of range distances determined from time delay measurements made from an orbiting constellation of satellites, the effect of multipath is to induce comparatively large instantaneous errors in the time of arrival measurements which translate into large errors in the indicated positions. Removal of these errors is the subject of most of the work done by previous workers in this field. Previous researchers have sought to deal with the effects of multipath by attempting to estimate the magnitude of the error introduced, and to subtract this error or to otherwise compensate for its effects.

The methods employed to acquire and demodulate data from spread spectrum transmissions is well known in the art. See R. E. Ziemer and R. L. Peterson, *Digital Communications and Spread Spectrum Systems,* Macmillan Publ Co., New York, 1985, pp. 419–447 for a discussion of acquisition and demodulation of spread spectrum signals. A spread spectrum GPS receiver must obtain both code and carrier synchronization in order to demodulate the desired data successfully. Issues associated with tracking and accurately demodulating a spread spectrum signal, once the signal is acquired, are discussed in many references on GPS, such as Alfred Leick, *GPS Satellite Surveying,* John Wiley & Sons, New York, Second Edition, 1995, and Ziemer and Peterson, op cit.

A GPS signal contains a 50 bit/second navigation message and a unique spreading code (C/A) of length 1.023 kilobits, which is transmitted at a frequency of about 1.023 Mbits/sec. Signal acquisition requires that phase lock first occur with the radio frequency carrier and that the reference or local replica signal be synchronized with the spreading code. In signal synchronization, a local replica of the particular satellite code is synchronized in time with the incoming satellite signal code.

Once the Doppler error in the downlink signal from the satellite is appropriately compensated for and signal synchronization is obtained, the navigation message in the 50 bit/second modulation that forms the composite GPS signal (direct plus multipath) can be demodulated. This navigation message contains data on the satellite ephemerides and time pulses that indicate when the transmission originated from the satellite. By measuring the difference between the local clock time and the indicated satellite time of transmission, the time delay, and thus the instantaneous distance from GPS receiver to satellite, can be obtained by multiplying this time delay by the speed of light in the ambient medium.

Signal synchronization is performed using a signal correlator. The correlator constantly compares the incoming signal with a local replica of the desired signal; a microprocessor adjusts a time shift $\tau$ of the local replica signal until satisfactory agreement is obtained. Because the incoming signal and the local replica signal are substantially identical, a measure of the degree of agreement of these two signals is often referred to as an autocorrelation function. A variety of autocorrelation functions $AC(\tau)$ are shown in various texts, and an example is shown in FIG. 1A. An autocorrelation function $AC(t)$ is formed according to the prescription $$AC(\tau) = \int_0^T s(t')S_d(t' + \tau)dt', \text{ or} \qquad (1A)$$

$$AC(\tau) = \sum_{k=1}^{K} s(t_k)S_d(t_k + \tau), \qquad (1B)$$

depending upon whether integration or summation of sampled values over a suitable contribution time interval is used to compute the composite signal autocorrelation function. The length T of the contribution time interval used to compute the autocorrelation function in Eq. (1A) or (1B) is often chosen to be N times the chip length $\Delta\tau_{chip}$, where N is a large positive number.

Tracking the composite satellite signal requires maintaining signal synchronization. The peak of the autocorrelation function is rounded, not pointed, due to finite bandwidth effects, so that locating a true peak is difficult. Receiver designers have, therefore, resorted to an "early-minus-late" correlation tracking method, as discussed by W. M. Bowles in "Correlation Tracking," Charles Stark Draper Laboratory, May 1980, by Fenton et al in U.S. Pat. No. 5,101,416, and by Lennen in U.S. Pat. Nos. 5,402,450 and 5,493,588. In the early-minus-late tracking method, a first correlator measures an equivalent autocorrelation function when the local replica signal is shifted to an "early" time $t_E$ relative to the position $(\tau=t_P)$ of an ideal or punctual replica, and a second correlator measures a second equivalent autocorrelation function when the local replica signal is shifted to a "late" time $t_L$. Early and late replicas of the punctual autocorrelation function $AC(\tau;P)$ are illustrated in FIG. 1B. By subtracting the late autocorrelation function from the early autocorrelation function, a correlation tracking function or autocorrelation difference function $\Delta AC(\tau)$ with a zero crossing, corresponding to the autocorrelation function peak can be developed, if the separations of the early and late time shifts from the punctual time shift are chosen to be equal. A representative early-minus-late tracking function $\Delta AC(\tau)$ is shown in FIG. 1C.

If the tracking or time shift variable $\tau$ for the autocorrelation difference function $\Delta AC(\tau)$ lies to the left (to the right) of the zero crossing point, the system uses the presence of positive (negative) values of $\Delta AC(\tau)$ to increase (decrease) the value of $\tau$ and drive the system toward the zero crossing point for $\Delta AC(\tau)$. The zero-crossing point is thus easily measured and tracked, and the equivalent peak value and peak location for the autocorrelation function is easily determined. At the zero-crossing point on this doublet-like tracking function, maximum correlation occurs between the incoming signal and the local replica signal. The zero-crossing point represents the best estimate of time shift $\tau$ for signal synchronization. The internal clock time corresponding to the zero crossing point is a good estimate for time of arrival of an incoming signal at the receiver.

Superposition of an equivalent autocorrelation function for the multipath signal (reduced in magnitude and delayed in time) onto the autocorrelation function $AC(\tau)$ for the desired satellite code signal is a useful model for analyzing the effects of presence of multipath signals, as noted in the Fenton et al patent and in the Lennen patent, op. cit. Superposition of any additional signal onto the desired incoming signal, during the time period when signal correlation occurs, will distort the desired autocorrelation function $AC(\tau;direct)$ and produce an altered autocorrelation function $AC(\tau;composite)$ for the composite signal (direct plus multipath). An autocorrelation function for an uncorrupted or "pure" direct signal is shown along with a representative, attenuated and time delayed, multipath autocorrelation function for positive relative polarity, compared to the direct signal, in FIG. 2A. The autocorrelation for the composite, corrupted incoming signal is obtained by summing the two autocorrelation functions and is compared with the uncorrupted autocorrelation function in FIG. 2B. FIGS. 2C and 2D are similar graphs, showing the autocorrelation function for a multipath signal with negative relative polarity, compared to the direct signal. Any such distortion produces errors in the indicated zero-crossing point on the early-minus-late correlation tracking function. These errors in indicated punctual time shift produce errors in the pseudorange measurements, and will in turn produce an error in the final computed estimate of location coordinates for the receiver.

Another useful and equivalent model for analyzing the effects of presence of a multipath signal computes the autocorrelation functions $AC(\tau;x;direct)$ and $AC(\tau;x;multipath)$ (x=E, L) for the pure direct signal and the pure multipath signal, forms the differences $\Delta AC(\tau;direct)$ and $\Delta AC(T;multipath)$ and adds these two difference functions to obtain the autocorrelation difference function $\Delta AC(\tau;composite)$ for the composite signal.

Representative autocorrelation difference functions for a direct incoming signal and a composite incoming signal are shown in FIG. 3B and 3D for positive relative multipath polarity and negative relative multipath polarity, respectively, compared to the direct signal. The tracking error due to presence of the multipath signal, obtained from the difference in zero crossing points for the direct signal and for the composite signal, is easily seen from these Figures.

Previous work in the area of multipath amelioration has focussed on two approaches: 1) estimating the effects and compensating for multipath-induced errors, and 2) attempting to limit the effects of the estimated multipath errors. In the Lennen patents, op. cit., both approaches are described. The estimation methods seek to model the distortions to the instantaneous autocorrelation function and to create a correction term to subtract from the indicated punctual time. Estimation methods are worthwhile but can never obtain perfection, wherein all multipath effects are removed, because the multipath signals are constantly varying and corrections can only be done after the fact.

A multipath limitation method, such as described in the Lennen patent, op. cit., operates the early-minus-late correlation tracking loop with a shorter delay between the early signal and late signal correlators than previous methods had employed. This limitation method reduces the effects of the presence of multipath substantially. In FIGS. 1B and 1C, the autocorrelation function $AC(\tau)$ and the corresponding tracking function $\Delta AC(\tau)$ are shown for the case where the early-minus-late time delay is approximately 0.15 times the width $\Delta\tau_{chip}$ of a digital signal bit or chip.

Several workers have analyzed correlation functions and/or have used pseudorandom signal sequences in attempting to estimate or suppress the effects of the presence of multipath signals. Examples of these are Winters in U.S. Pat. No. 4,007,330, Tomlinson in U.S. Pat. No. 4,168,529, Bowles et al in U.S. Pat. Nos. 4,203,070 and 4,203,071, Guignon et al in U.S. Pat. No. 4,550,414, Dickey et al in U.S. Pat. No. 4,608,569, Liebowitz in U.S. Pat. No. 4,660,164, Borth et al in U.S. Pat. No. 4,829,543, McIntosh in U.S. Pat. No. 4,862,478, Wales in U.S. Pat. No. 5,091,918, Fenton et al in U.S. Pat. Nos. 5,101,416, 5,390,207, 5,414,729 and 5,495,499, Cai et al in U.S. Pat. No. 5,164,959, Scott et al in U.S. Pat. No. 5,282,228, Meehan in U.S. Pat. No. 5,347,536, Lennen in U.S. Pat. Nos. 5,402,450 and 5,493,588, Johnson et al in U.S. Pat. No. 5,444,451, Kuhn et al in U.S. Pat. No. 5,481,503, and Fox et al in U.S. Pat. No. 5,488,662.

In previous methods for multipath amelioration, samples are taken of the incoming direct (desired) signal plus the incoming multipath signal(s) over the entire width of the chip, using a uniform sampling rate and assigning a uniform weight to each sample. What is needed here is an approach that obtains correlation information from portions of a chip width where the effects of presence of multipath signals are reduced. Preferably, the approach should be flexible enough to allow suppression of a controllable amount of multipath signal contributions to the autocorrelation and autocorrelation difference functions and should continue to provide tracking indicators that indicate the direction of time shift required to achieve and maintain signal synchronization.

SUMMARY OF THE INVENTION

These needs are met by the invention, which provides a method that changes the magnitude and shape of the autocorrelation function to suppress or de-emphasize the contributions of a multipath signal, in a selected region that does not include the tracking point associated with an early-minus-late autocorrelation difference function $\Delta AC(\tau)=AC(\tau;E)-AC(\tau;L)$. The invention utilizes the fact that the useful information to be obtained from the incoming composite signal is available in bit transition regions for the direct signal, where the direct signal bit value changes state. Contributions from samples that contain no useful information, but that do contain multipath signal effects that produce erroneous distortions in the corresponding autocorrelation function and in the resulting correlation tracking function, are ignored or suppressed. By ignoring or suppressing the contribution of samples taken in regions where no transition in a signal bit value can occur, the receiver can suppress the effects of multipath signals.

The portion of the autocorrelation difference function $\Delta AC(\tau)$ that is zero or relatively small is much larger than in any of the previous methods for ameliorating multipath. All previous methods have wider regions for the desired signal where $\Delta AC(\tau)$ is not substantially zero. This is significant. The autocorrelation difference functions $\Delta AC(\tau;direct)$ and $\Delta AC(\tau;multipath)$, computed for a direct or ideal signal and for a multipath-only signal, are added to form $\Delta AC(T;composite)$ for the composite signal. The digital direct signal (after downconversion to baseband and digitization of the incoming $(\Delta\tau_{chip})^{-1}$. The difference $\Delta AC$ ($\tau$;multipath) has a larger region where this quantity is substantially zero than does the conventional multipath signal $\Delta AC0(t;\text{multipath})$ so that the resulting error in the zero crossing point for $\Delta AC(\tau;\text{composite})$ should be reduced. The invention, which may be characterized as non-uniform weighting of the sampling function used to create $AC(\tau;x)$ (x=E, L) and $\Delta AC(\tau)$, provides a method for substantially suppressing or eliminating multipath effects in correlation tracking.

A tracking point or zero-crossing point $\tau=t_P$ associated with the difference function $\Delta AC(\tau)$ of the autocorrelation functions $AC(\tau;E)$ and $AC(\tau;L)$ is determinable as before. This tracking point is obtained with reduced contributions from the direct signal and from the multipath signal in a selected central region, between bit value transition points for the digital direct signal $S_d(t+\tau)$, that does not include the tracking point $\tau=t_P$. This central region, which may be characterized as a region where $\tau=t_P \pm \Delta\tau_{chip}/2$, does not include any time shift values $\tau$ for which the instantaneous value of a reference or local replica digital signal $S_d(t+\tau)$ can make a signal bit value transition (from 0 to 1, or from 1 to 0) relative to the instantaneous value of an incoming digital composite signal s(t). Thus, little or no qualitative information is lost by de-emphasizing the contribution of this central region to a corresponding autocorrelation function. However, much of the important information on bit value transitions associated with the multipath signal is present in this central region, because the multipath signal is time delayed relative to the direct signal. This multipath information is suppressed or de-emphasized by suppressing the contribution of this central region to the autocorrelation function. Location of the "true" tracking point for the direct signal (absent multipath) is unchanged or is changed only minimally by this approach. The contribution of the multipath signal in the selected central region is reduced to substantially zero.

The invention suppresses the contribution of a central region (between consecutive bit value transition points for the digital direct signal $S_d(t)$) to the computed autocorrelation function $AC(\tau;E$ or $P$ or $L)$ for the composite digital signal s(t) by imposing a non-uniform weighting function w(t+t) in the integral or sum of the signal product $s(t)S_d(t+\tau)$ over a chosen time interval $t1 \leq t \leq t2$, to produce an adjusted or modified autocorrelation function. In a first embodiment involving what are called "notch functions," the weighting function w(t) is positive in signal bit value transition regions ($t \approx t1$ and $t \approx t2=t1+\Delta\tau_{chip}$) and tends monotonically toward zero as t approaches an intermediate time t3 (t1<t3<t2) from either side. The chip half-width $\Delta\tau_{chip}/2=(t2-t1)/2$ might be chosen to be the inverse of twice the carrier frequency, $(2 f_{carrier})^{-1}$, associated with the reference digital direct signal $S_d(t)$. In a second embodiment, the weighting function w(t) is equal to a positive constant minus a notch function (an "anti-notch function"). In a third embodiment, the weighting function w(t) is non-uniform but is neither a notch function nor an anti-notch function. The contributions of different portions of the "contribution interval", $t1 \leq t \leq t2$, are weighted non-uniformly to reduce the effects of an extant multipath signal in a central region away from a tracking point $\tau=t_P$, as discussed above.

In a preferred embodiment, method and apparatus are provided for accumulating autocorrelation function data representing a timing relationship in a spread spectrum system between a digital composite signal, containing a desired signal, and a digital replica (reference signal) of the desired signal. A weighting signal is combined with the composite signal and reference signal to generate a weighted signal that is accumulated over a selected time interval. The reference signal and weighting signal may be time shifted to an early time and to a late time relative to the time of arrival of the composite signal. A difference of the resulting early and late weighted signals may be accumulated over the selected time interval.

The method and apparatus are used in decoding a composite signal that includes the desired signal and a signal-distorting component. In this embodiment, the weighting signals have predetermined characteristics that suppress the effects of the signal-distorting component, after the weighting signal, reference signal and composite signal are mixed and accumulated.

Each weighting signal in the preferred embodiment is generated from a sequence of predetermined weighting values in a chosen time interval. At least one weighting signal is not constant in time and may be non-zero for a time interval of fixed or variable length surrounding a bit value transition time for the replica signal. A weighting function may also be generated using a composite signal sampling procedure with a variable temporal sampling density. The invention also provides apparatus, in several forms for implementation of an embodiment to decode a composite signal that includes the desired signal and a signal-distorting component.

DESCRIPTION OF BEST MODES OF THE INVENTION

Figure 1A:
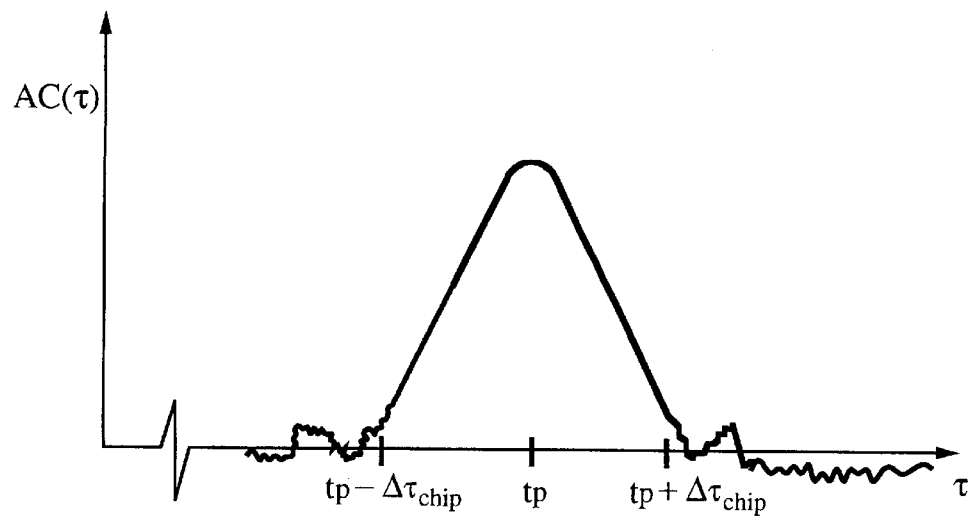
FIGS. 1A and 1B are graphical views of a representative autocorrelation function $AC(\tau;x)$ (x=P, E, L).
Figure 1B:
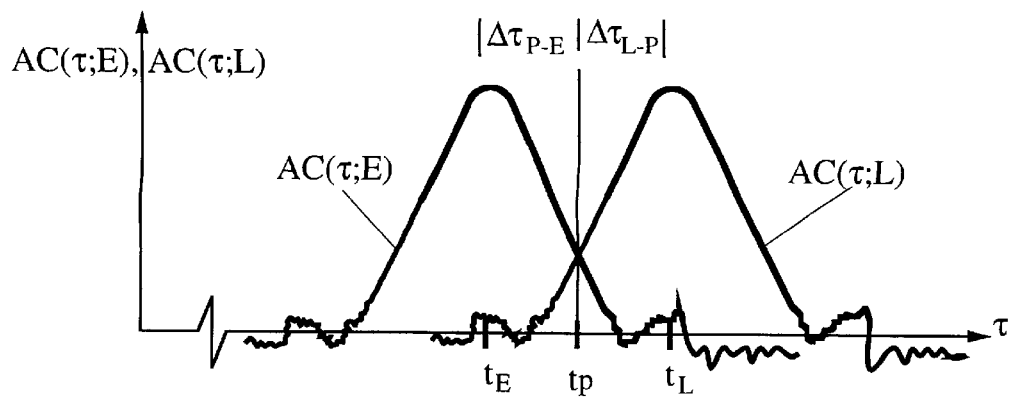
Figure 1C:
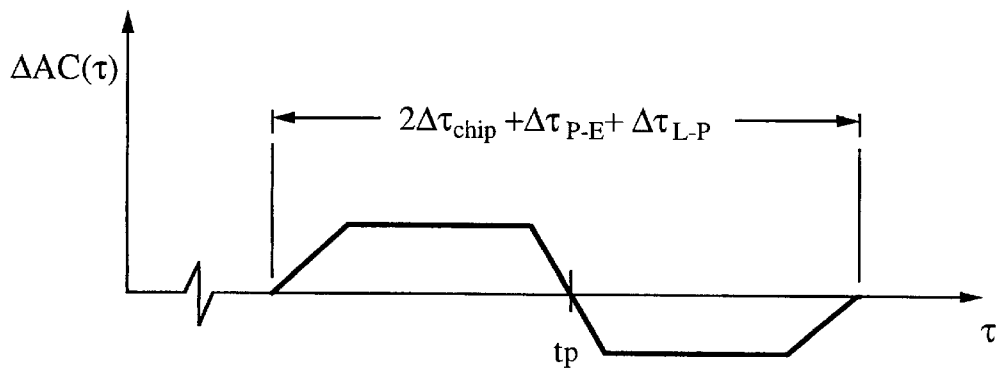
FIG. 1C is a graphical view of an early-minus-late autocorrelation function difference signal $\Delta AC(\tau)=AC(\tau;E)-AC(\tau;L)$ formed from the autocorrelation functions shown in FIG. 1B. In all early-minus-late autocorrelation difference functions shown herein, unless otherwise stated, the early-minus-late spacing $\Delta t_{L-E}=t_L-t_E$ is 15 percent of the chip width $\Delta\tau_{chip}$ for definiteness. Other values for $\Delta t_{L-E}$ can be used here.
Figure 4A:
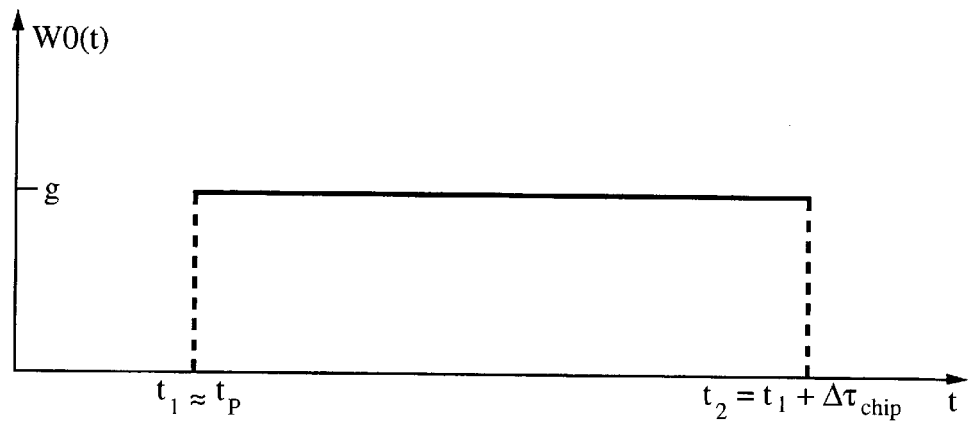
FIGS. 4B and 4C are graphical views of punctual (P), early (E) and late (L) conventional autocorrelation functions $AC0(\tau;x)$, computed using an implicit conventional (constant amplitude) weighting function w0 shown in FIG. 4A.
Figure 4B:
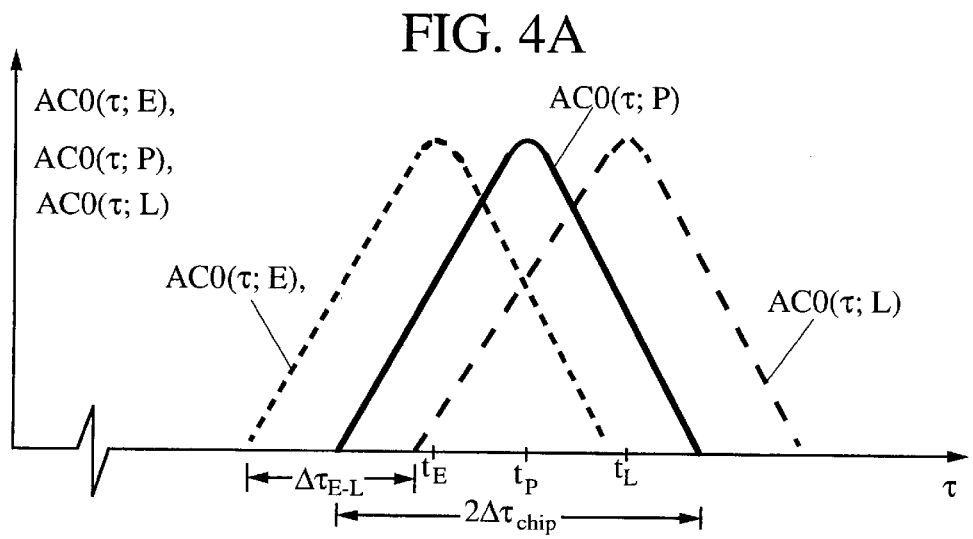

In a conventional approach to formation of the autocorrelation function, the weighting function that is implicitly applied to the integrand or summand has constant amplitude: w0(t)=g (constant), with g>0, across the contribution interval, for example, $t_P \leq t \leq t_P + \Delta \tau_{chip}$, as illustrated in FIG. 4A. The quantity $\Delta \tau_{chip}$ is the temporal length of one bit in the incoming signal of interest. An autocorrelation function, computed using the implicit conventional weighting function w0(t), has small or vanishing values outside the interval $t_P - \Delta \tau_{chip} \leq t \leq t_P + \Delta \tau_{chip}$, due to the properties of pseudorandom sequences that are used for the direct signal. As the autocorrelation displacement variable t increases from t=$t_P$-$\Delta \tau_{chip}$ to t=$t_P$+$\Delta \tau_{chip}$, the autocorrelation function increases linearly to a maximum value at a tracking point $\tau \approx t_P$, then decreases linearly beyond the tracking point (FIG. 1A). The implicit conventional weighting function w0(t), shown in FIG. 4A, is used in computation of a conventional autocorrelation function AC0($\tau$;x) (x=E, P or L), shown in FIG. 4B, and is used in computation of a conventional early-minus-late autocorrelation difference function $\Delta$AC0($\tau$), illustrated in FIG. 4C. The time shift values $\tau$=$t_E$ and $t_L$ chosen for the approximate peak values of the conventional autocorrelation functions AC0($\tau$;x) (x=E or L) satisfy the constraints $t_E < t_P < t_L$, where $\tau = t_P$ is the time shift value for the actual peak in the measured autocorrelation function. The time shift values $\tau$=$t_E$ and $\tau$=$t_L$ may be, but need not be, chosen symmetrically about the time shift value $\tau$=$t_P$.

Assume that a (digital) multipath signal $S_m(t;\Delta t_m)$ is present, with a time delay $\Delta t_m$ and reduced in amplitude relative to the digital direct signal $S_d(t)$, in the incoming digital composite signal s(t)=$S_d(t)$+$S_m(t;\Delta t_m)$. The time-delayed and reduced-amplitude multipath signal $S_m(t;\Delta t_m)$ is also summed across the contribution time interval in computation of the autocorrelation signal AC($\tau$;x) (x=E, P or L). Because of linear superposition, the multipath signal $S_m(t;\Delta t_m)$ contributes a proportional amount (reduced in amplitude and delayed in time) to the early and late autocorrelation functions AC($\tau$;E) and AC($\tau$;L) and to the difference function $\Delta$AC($\tau$)=AC($\tau$;E)−AC($\tau$;L) for the incoming digital composite signal s(t). Typical multipath signal contributions to AC($\tau$;x) (x=E, L) are illustrated in FIGS. 2A, 2B, 2C and 2D.

Figure 2A:
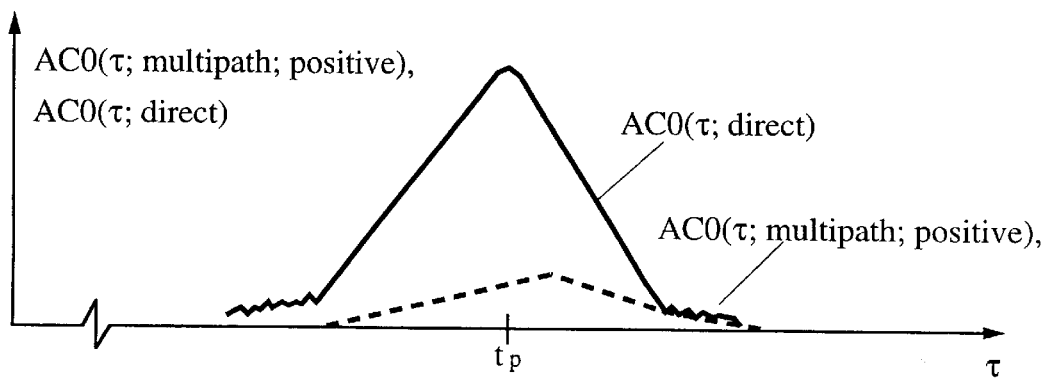
FIGS. 2A and 2C compare a conventional autocorrelation function $AC0(\tau;\text{direct})$, formed using only a direct signal, with a conventional autocorrelation function $AC0(\tau;\text{multipath})$ formed using only a multipath signal, where the multipath signal has positive polarity and negative polarity, respectively, relative to the direct signal.
Figure 2B:
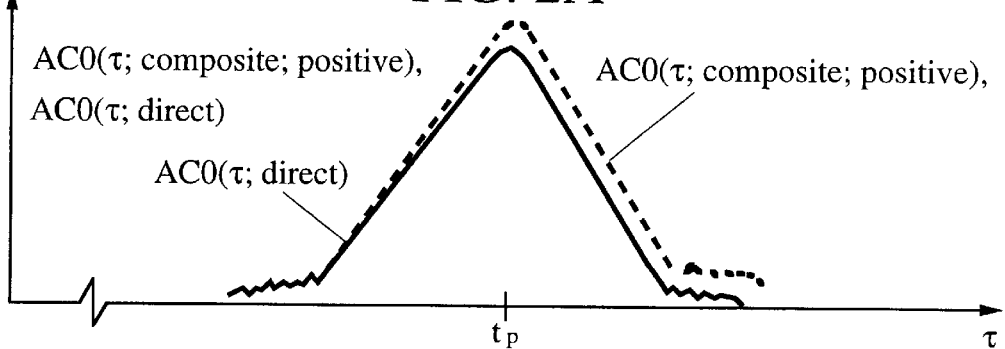
FIGS. 2B and 2D compare $\Delta AC0(\tau;\text{direct})$ and $\Delta AC0(\tau;\text{composite})$ for the respective FIGS. 2A and 2C.
Figure 2C:
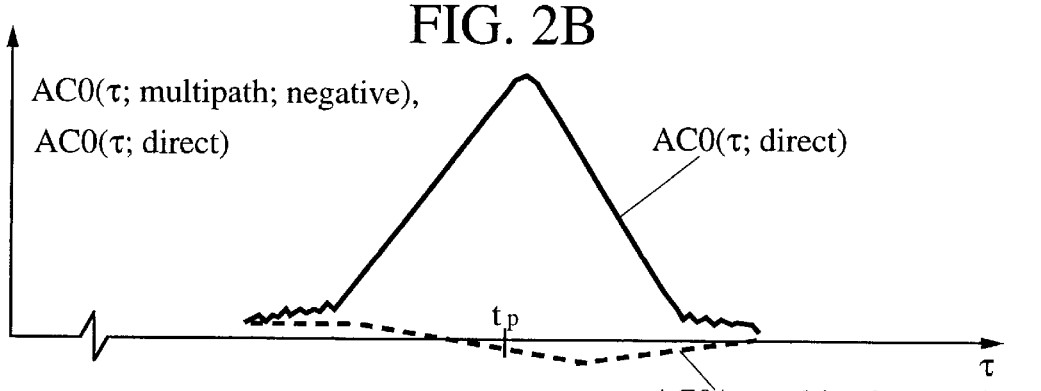
Figure 2D:
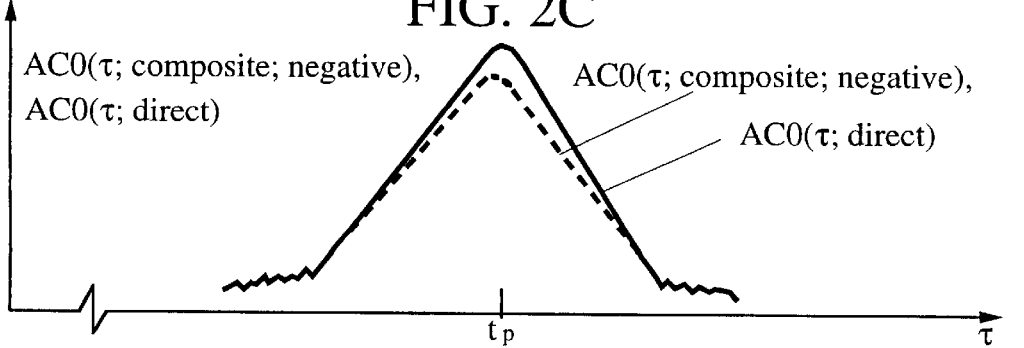

The polarity of a digital multipath signal $S_m(t;\Delta t_m)$ that is part of an incoming digital composite signal may be positive or negative relative to the digital direct signal $S_d(t)$. A digital multipath signal with positive relative polarity will add to the digital direct signal contribution to the autocorrelation function for a digital composite signal. FIGS. 2A and 2C compare the autocorrelation function $AC(\tau;x;\text{direct})$ with $AC(\tau;x;\text{positive})$ and $AC(\tau;x;\text{negative})$ for a "bare" multipath signal having positive and negative multipath relative polarity, respectively. A digital multipath signal with positive (negative) multipath relative polarity will add to (subtract from) the digital direct signal contribution in the autocorrelation signal $AC(\tau;x;\text{composite})$.

Because the effects of presence of a multipath signal are additive, one can analyze the autocorrelation difference functions by using the sum $\Delta AC(\tau;\text{direct})+\Delta AC(\tau;\text{multipath})$ or by forming the sum composite=direct+multipath before the autocorrelation difference function $\Delta AC(\tau;\text{composite})$ is computed.

Figure 3A:
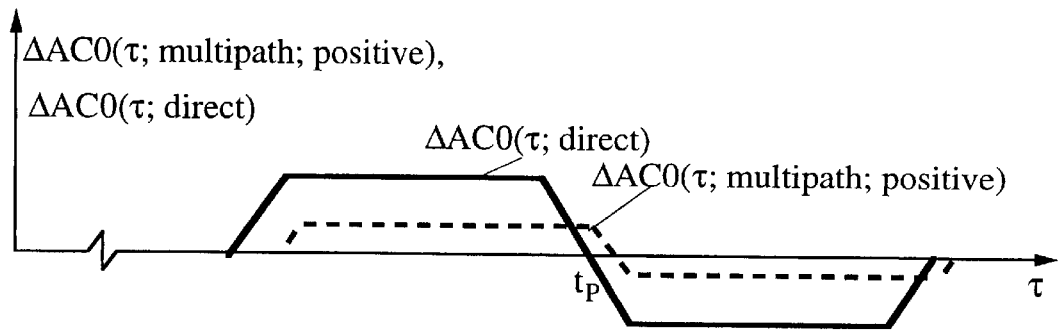
FIGS. 3A and 3C compare a conventional autocorrelation difference function $\Delta AC0(\tau;\text{direct})$, formed using only a direct signal, with a conventional autocorrelation difference function $\Delta AC0(\tau;\text{multipath})$ formed using only a multipath signal, where the multipath signal has positive polarity and negative polarity, respectively, relative to the direct signal.
Figure 3B:
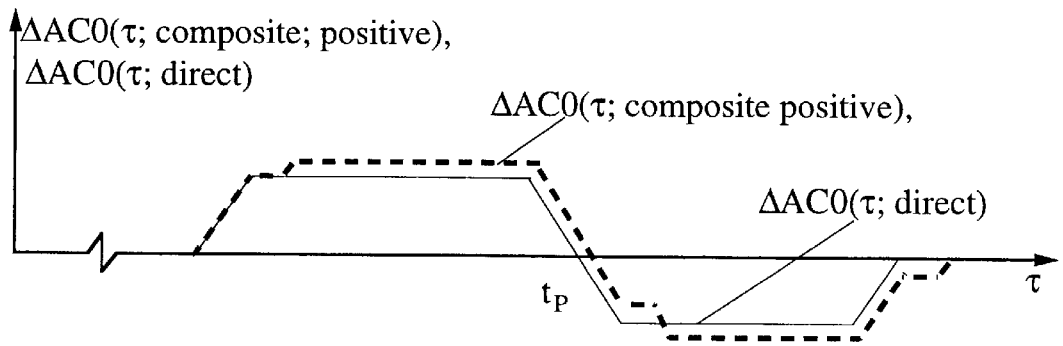
FIGS. 3B and 3D compare $\Delta AC0(\tau;\text{direct})$ and $\Delta AC0(\tau;\text{composite})$ for the respective FIGS. 3A and 3C.
Figure 3C:
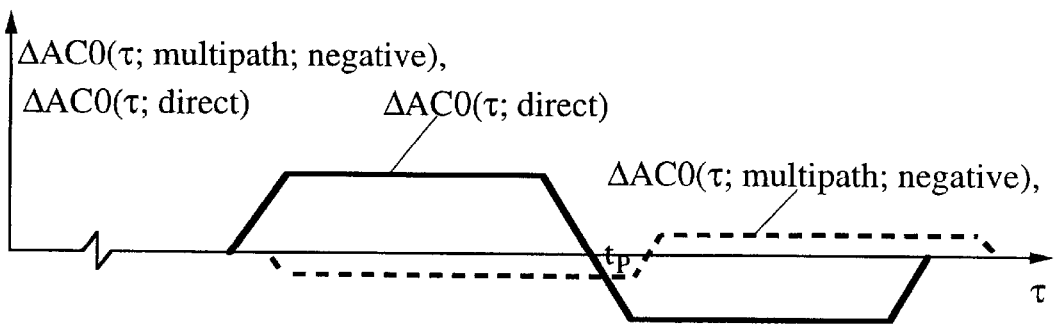
Figure 3D:
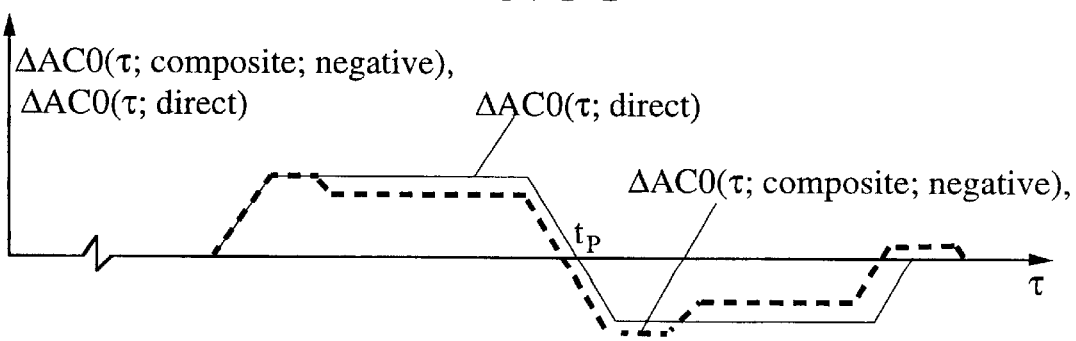

FIGS. 3A and 3C graphically illustrate conventional autocorrelation difference functions $\Delta AC0(\tau;\text{direct})$ (solid curve) and $\Delta AC0(\tau;\text{multipath})$ for two representative situations, computed using the implicit conventional weighting function $w0(t)$ in FIG. 4A, where the multipath signal has positive and negative relative polarity. FIGS. 3B and 3D graphically compare early-minus-late autocorrelation difference functions $\Delta AC(\tau;\text{direct})$ (solid curve) and $\Delta AC(\tau;\text{composite})$ for digital multipath signals with positive and negative relative polarity, respectively. Note that the apparent tracking or zero crossing point for the digital composite signal is shifted to the right ($t_{P+}$) or to the left ($t_{P-}$) relative to the desired tracking point $\tau = t_P$ for the direct signal, which results in a tracking error due to the presence of the multipath signal.

Figure 5A:
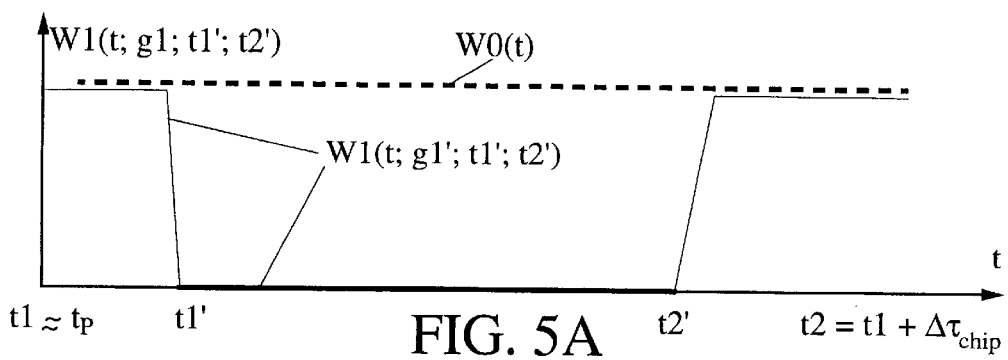
FIGS. 5B and 5C are graphical views of an autocorrelation function $AC1(\tau;x;q)$ (x=E, P or L) and of an early-minus-late autocorrelation difference function $\Delta AC1(\tau;q)$, computed using a non-uniform weighting function (two-value step function) w1(t;q) shown in FIG. 5A.
FIG. 5D is a graphical view of a two-value non-uniform weighting function that is an alternative to that shown in FIG. 5A.
Figure 5B:
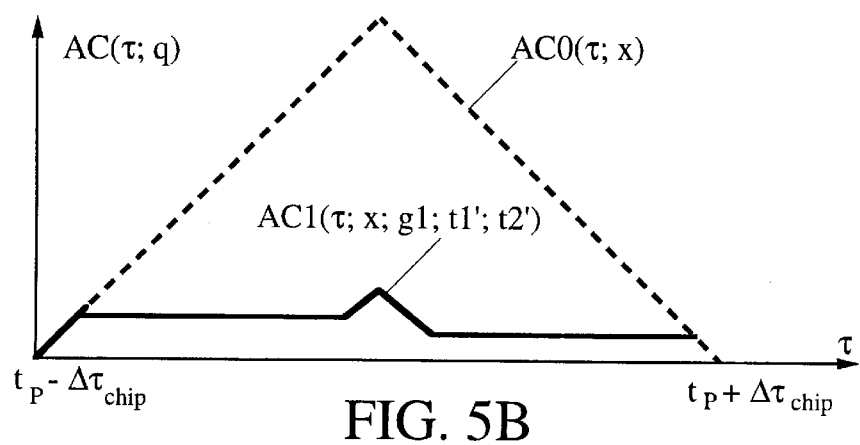
Figure 5C:
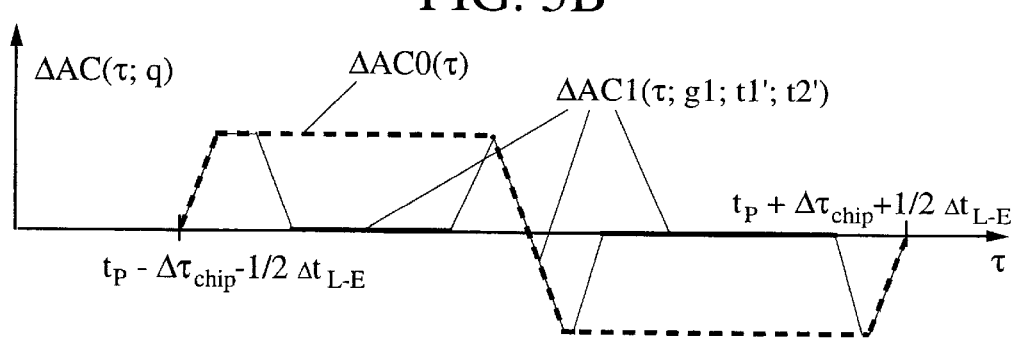

In a first embodiment of the invention, illustrated in FIGS. 5A, 5B and 5C, a non-uniform weighting function $w1(t;g1;t1';t2')$ is used that may be continuous or discontinuous and is not necessarily symmetric. The endpoints $t1$ and $t2$ of the time interval used for definition of the weighting function, such as $w1(t;g1;t1';t2')$, satisfy the constraints $$t2 - t1 = \Delta\tau_{chip}, \quad (2A)$$

$$t1 \approx t_P. \quad (2B)$$

For notational convenience herein, a set of weighting function parameters, such as $g1$, $t1'$ and $t2'$ for a weighting function such as $w1$, will often be denoted by a symbol "q." With this notation adopted, the weighting function $w1$ becomes $w1(t;q)$. In FIG. 5A, the weighting function $w1(t;q)$ is a two-value step function that is non-zero only in regions near $\tau = t_P$, and near $\tau = t_P + \Delta\tau_{chip}$. In a center region, away from the tracking points $\tau = t_P$ and $\tau = t_P + \Delta\tau_{chip}$, where no digital direct signal bit transition can occur, little or no new qualitative information is presented, and use of a non-uniform weighting function $w1(t;q)$ suppresses or de-emphasizes this largely redundant information, as discussed above.

A weighting function, such as $w1(t;q)$, is preferably extended periodically, using a prescription such as $$w1(t;q) = w1(t + n\,\Delta\tau_{chip};q) \quad (n=0, \pm 1, \pm 2, \ldots). \quad (3)$$

Where non-uniform weighting is used, an autocorrelation function is formed according to the prescription $$AC(t) = \int_0^T w(t'+\tau;q)s(t')S_d(t'+\tau)dt', \text{ or} \quad (4A)$$

$$AC(\tau) = \sum_{k=1}^K w(t_k+\tau;q)s(t_k)S_d(t_k+\tau), \quad (4B)$$

depending upon whether integration or summation of sampled values over a suitable contribution time interval is used to compute the composite autocorrelation function. The length T of the time interval used to compute the autocorrelation function in Eq. (4A) or (4B) is often chosen to be N times the chip length $\Delta t_{chip}$, where N is a large positive integer.

FIG. 5B compares the approximate forms of the conventional autocorrelation function $AC0(\tau;P)$, which uses an implicit constant amplitude weighting function ($w0(t) = g1$, with $g1=1$ preferred), with an adjusted punctual autocorrelation function $AC1(\tau;x;q)$ (x=P), which uses the non-uniform weighting function $w1(t;q)$. The early and late autocorrelation functions $AC1(\tau;E;q)$ and $AC1(\tau;L;q)$ are formed in a similar manner and have the same shape as the punctual autocorrelation function $AC1(\tau;P;q)$.

Figure 4C:
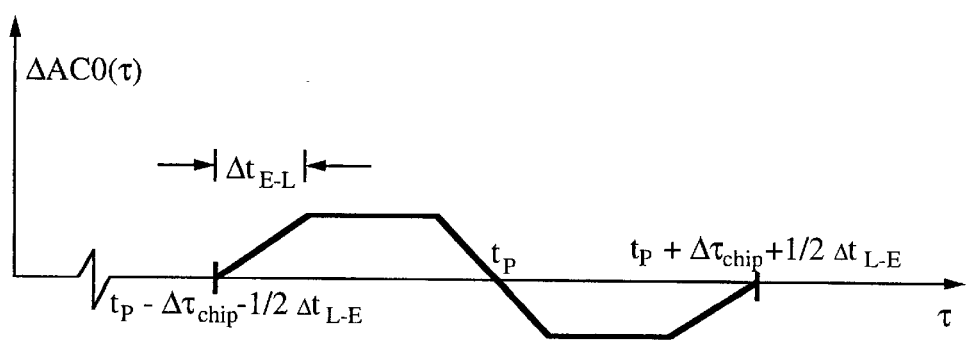

FIG. 5C illustrates the approximate form of the difference function $\Delta AC1(\tau;q) = AC1(\tau;E;q) - AC1(\tau;L;q)$, which should be compared with the corresponding conventional autocorrelation function difference $\Delta AC0(\tau)$, shown in FIG. 4C and repeated as a dashed line curve in FIG. 5C. The spacing intervals $\Delta t_{P-E} = t_P - t_E$ and $\Delta t_{L-P} = t_L - t_P$ are selected to be equal in each of FIGS. 4C and 5C. If the time shift variable $\tau$ for the autocorrelation difference function $\Delta AC1(\tau;q)$ lies a small amount to the left (to the right) of the peak correlation location $\tau = t_P$, the tracking system uses the presence of positive values (negative values) of $\Delta AC1(\tau;q)$ near this peak correlation location to increase (decrease) the value of the variable t and drive the autocorrelation function $AC1(\tau;x;q)$ toward its peak correlation value by driving $\Delta AC1(\tau;x;q)$ to zero.

Figure 5D:
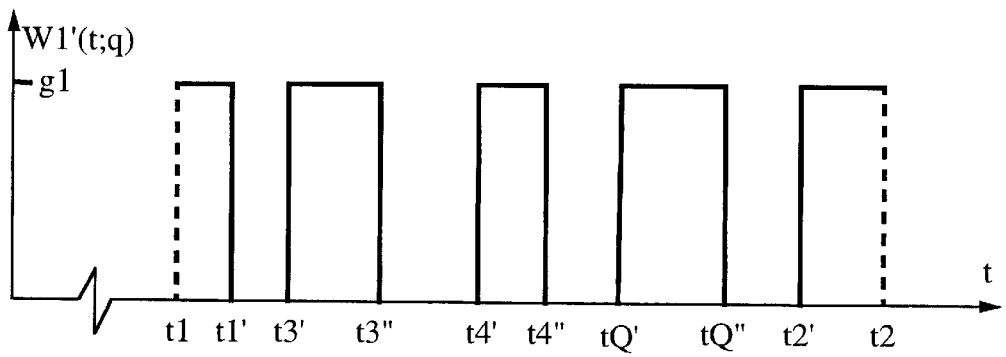

More generally, a non-uniform weighting function $w1'(t;g1;t1';t2';t2''; \ldots ;tn';tn'';t(n+1)')$ that has a sequence of steps of equal amplitude ($=g1$) in the time intervals $t1<t<t1'$, $tk'<t<tk''$ ($k=3, \ldots, Q$) and $t2'<t<t2$, illustrated in FIG. 5D, can be used here.

Where the non-zero amplitudes of the steps are equal, as in FIG. 5A or 5D, use of a non-uniform weighting function, such as $w1(t;q)$ or $w1'(t;q)$, is equivalent to use of non-uniform sampling density in forming the autocorrelation function $AC1(\tau;q)$ in Eq. (4A) or (4B). In this non-uniform sampling approach, samples of incoming signal values in the regions $t1<t<t1'$, $tk'<t<tk''$ and $t2'<t<t2$ are given a uniform, non-zero weight g, and samples in all other regions are assigned a weight of zero. Alternatively, non-uniform weighting and non-uniform sampling may be combined to compute an autocorrelation function.

Figure 6A:
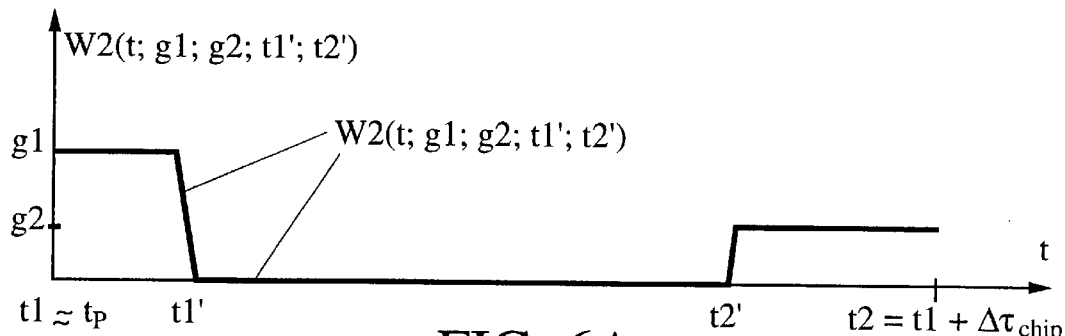
FIGS. 6B and 6C are graphical views of an autocorrelation function AC2($\tau$;x;q) (x=E, P or L) and of an autocorrelation difference function $\Delta$AC2($\tau$;q), computed using a non-uniform weighting function (three-value step function) w2(t;q) shown in FIG. 6A.
FIG. 6D illustrates the autocorrelation difference function shown in FIG. 6C, with and without the presence of a representative multipath function.
Figure 6B:
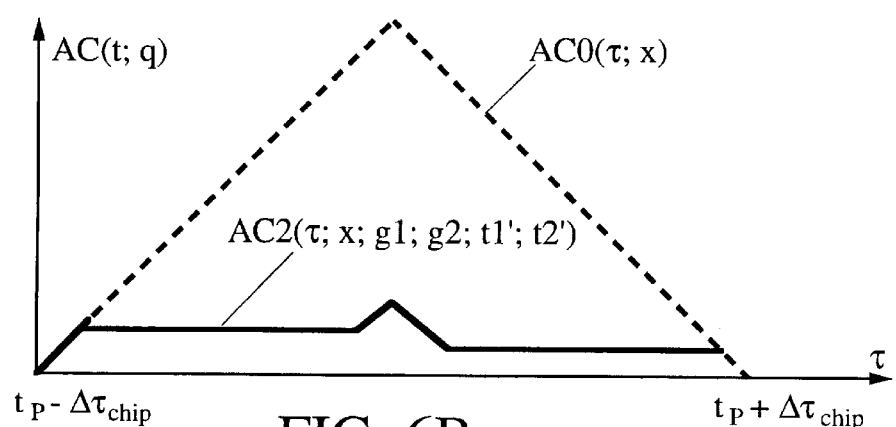
Figure 6C:
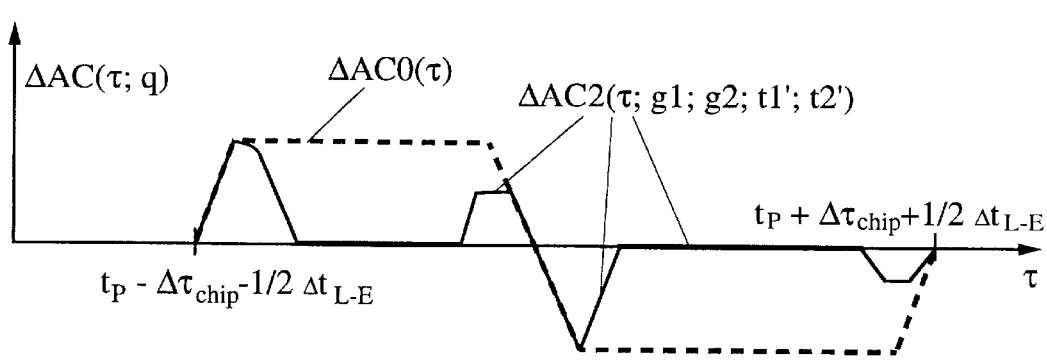

The weighting function may be a three-value step function $w2(t;g1;g2;t1';t2')$ with two distinct non-zero amplitudes $g1$ and $g2$, as shown in FIG. 6A. FIG. 6B compares the corresponding autocorrelation function $AC2(\tau;x;q)$ (x=E, P or L), computed using the weighting function $w2(t;q)$, with the conventional autocorrelation function $AC0(\tau;x)$. FIG. 6C compares the autocorrelation difference function $\Delta AC2(\tau;q) = AC2(\tau;E;q) - AC2(\tau;L;q)$, where $\Delta t_{P-E} = \Delta t_{L-P}$, with the conventional autocorrelation difference function $\Delta AC0(t)$ (dashed line curve).

By using a non-uniform weighting function, such as $w1(t;q)$ or $w2(t;q)$ in FIG. 5A or 6A, for computation of the autocorrelation function, the contribution of the multipath signal $S_m(t;\Delta t_m)$ to the autocorrelation difference function ΔAC(τ;q), in a central region away from a tracking point τ=$t_P$, is suppressed. It is the digital signal bit value transitions, at the carrier frequency $f_{carrier}$, that allow alignment of the digital direct signal $S_d$(t+t) to the incoming digital composite signal s(t). A central region away from a tracking point τ=$t_P$ and away from a bit value transition point contributes little or no new qualitative information to an autocorrelation difference function ΔAC(τ;x;direct) (x=E, P or L), computed in the absence of a multipath signal, because no digital signal bit value transition occurs in this region. However, an extant multipath signal may contribute important information in this central region, because of the possible presence of digital signal bit value transitions of the multipath signal $S_m$(t;Δ$t_m$) in this region, where the time delay Δ$t_m$ may be anywhere in the time interval 0<Δ$t_m$<Δ$τ_{chip}$. A non-uniform weighting function, such as w2(t;q) (t1<t<t2; t2−t1=Δ$τ_{chip}$), is preferably applied periodically in computation of an autocorrelation function as in Eq. (4A) or (4B) over the contribution time interval of length N Δ$τ_{chip}$.

FIGS. 3A–3D illustrate the effect of presence of a multipath signal on the tracking or zero crossing point of the conventional autocorrelation difference function ΔAC0(τ). Presence of a multipath signal usually causes translation of the apparent zero crossing point and, therefore, an error in location of the desired tracking point.

Figure 6D:
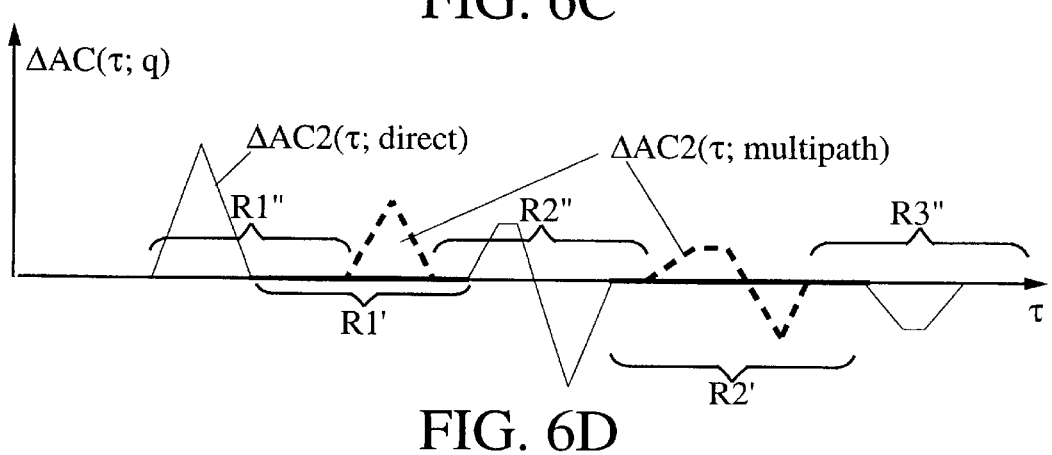

In FIG. 6D, the autocorrelation difference function ΔAC2 (τ;q;direct) (solid curve), obtained using the weighting function w2(τ;q), is compared with the autocorrelation difference function ΔAC2(τ;q;multipath) (attenuated and time delayed; dashed line curve) for an extant multipath signal. The autocorrelation difference function ΔAC2(τ;q;composite) is the sum of ΔAC2(τ;q;direct) and ΔAC2(τ;q;multipath). Note the sub-regions, R1' and R2', within the region $t_P$−Δ$τ_{chip}$−Δ$t_{L−E}$/2≦τ≦$t_P$+Δ$τ_{chip}$+Δ$t_{L−E}$/2 where the difference function ΔAC2(τ;q;direct) (solid curve) is substantially zero, and the sub-regions, R1", R2" and R3", where the difference function ΔAC2(τ;q;multipath) (dashed line curve) is substantially zero. The subregions R1', R2', R1", R2" and R3", together cover the region $t_P$−Δ$τ_{chip}$−Δ$t_{L−E}$/2≦τ≦$t_P$+Δ$τ_{chip}$+Δ$t_{L−E}$/2. For each value τ in the region $t_P$Δ$τ_{chip}$−Δ$t_{L−E}$/2≦τ≦$t_P$+Δ$τ_{chip}$+Δ$t_{L−E}$/2, at least one of the difference functions ΔAC2(τ;q;direct) and/or ΔAC2(τ;q;multipath) is substantially zero so that the sum ΔAC2(τ;q;direct) +ΔAC2 (τ;q;multipath) is easily formed in this region. In FIG. 6D, the primary zero crossing for the difference function ΔAC2 (τ;q;direct)+ΔAC2(τ;q;multipath) for the incoming digital composite signal s(t) is the same, with or without inclusion of the multipath signal. Where the weighting function w2(t;q) is used, presence of this multipath signal introduces no error in the tracking point for the composite signal. Here, the relative polarity, positive or negative, of the multipath signal is irrelevant.

Use of a non-uniform weighting function with a relatively low amplitude between bit value transition points (away from a tracking point) has no substantial effect on location of the tracking point using an autocorrelation difference function ΔAC2(τ;q) for the digital direct signal, because the value of the direct digital signal $S_d$(t) makes no digital signal bit value transition in this region. Use of many of the non-uniform weighting functions, as contemplated by the invention, reduces the effects of an extant multipath signal $S_m$(t;Δ$t_m$) on the tracking point location for the early-minus-late difference function ΔAC2(τ;q) computed for the incoming digital composite signal, for the reasons set forth above.

If one or both of the widths Δt1=t1'−t1 or Δt2=t2−t2' of the non-zero portions of the weighting function w2(t;q) shown in FIG. 5A or 6A are reduced along with a corresponding reduction in Δ$t_{L−E}$, the contributing effects of an extant multipath signal to tracking error are correspondingly reduced. Preferably, these widths Δt1 and Δt2 and the corresponding Δ$t_{L−E}$ are not reduced to zero. Small but non-zero widths are needed to allow tracking of the digital direct signal in the presence of non-multipath system noise. An appropriate compromise for the widths for the weighting function w2(t;q) might be 0.03 Δ$τ_{chip}$≦|tk−tk'|≦0.3 Δ$τ_{chip}$ (k=1, 2).

Figure 7A:
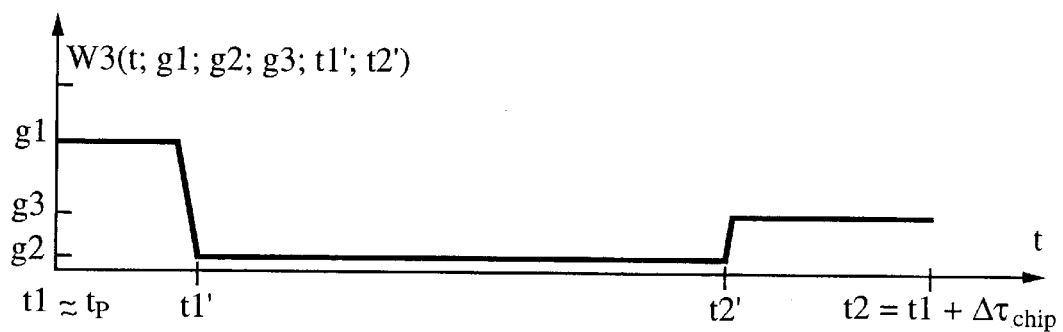
FIGS. 7B and 7C are graphical views of an autocorrelation function AC3($\tau$;x;q) (x=E, P or L) and of an autocorrelation difference function $\Delta$AC3($\tau$;q), computed using a non-uniform weighting function (three-value step function with non-zero interior step) w3(t;q) shown in FIG. 7A.
Figure 7B:
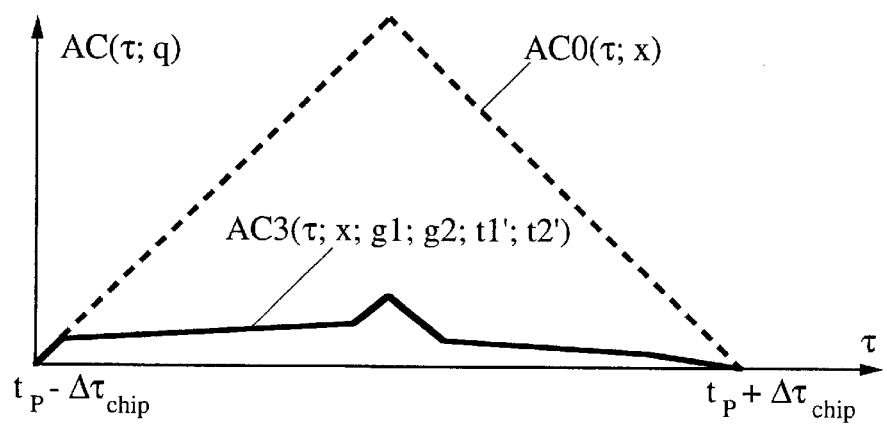
Figure 7C:
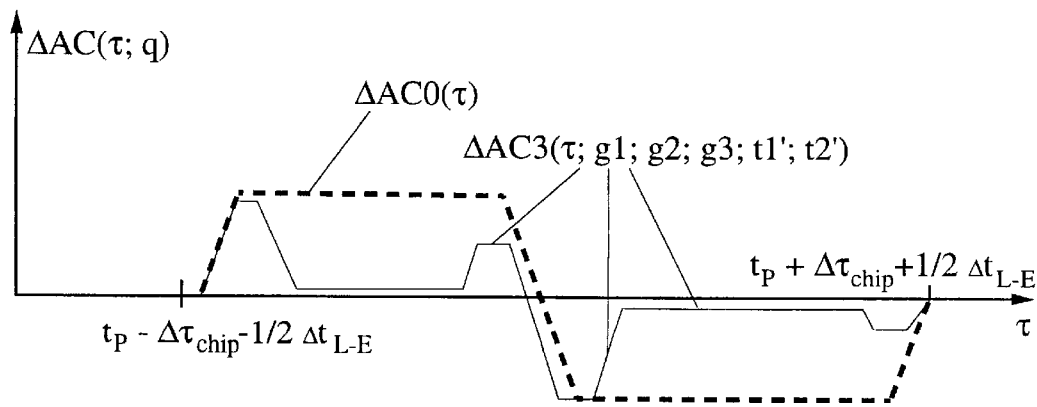

FIG. 7A illustrates another discontinuous weighting function w3(t;g1;g2;g3;t1';t2') that can be used here, in which the weighting function is a three-value step function whose amplitude drops to a smaller, non-zero value f≈0 (e.g., f≈0.1) in a central region between the wings (t1≦t≦t1+Δt1, t2−Δt2≦t≦t2), rather than decreasing to a value of zero in a central region as in FIG. 6A. Use of the weighting function w3(t;q) produces a corresponding adjusted autocorrelation function AC3(τ;P;q) that is illustrated in FIG. 7B and a corresponding early-minus-late autocorrelation difference function ΔAC3(τ;q)=AC3(τ;E;q)−AC3(τ;L;q), which is compared in Figure 7C with ΔAC0(T). One advantage of use of the weighting function w3(t;q), rather than use of the weighting function w2(t;q), in formation of the adjusted autocorrelation is that, when the early-minus-late time shift variable τ lies away from the tracking point τ=tp, in region R1 or region R2 in FIG. 7C, for example, the amplitude and sign of the difference function ΔAC3(τ;q) will indicate the direction the tracking variable t should move to return to the tracking point, if desired. Within the regions R1 and R2 in FIG. 6C, the correlator system receives no indication of which way the tracking should move to return to the tracking point (τ=$t_P$), because the autocorrelation difference function amplitude is zero in these regions.

Figure 8A:
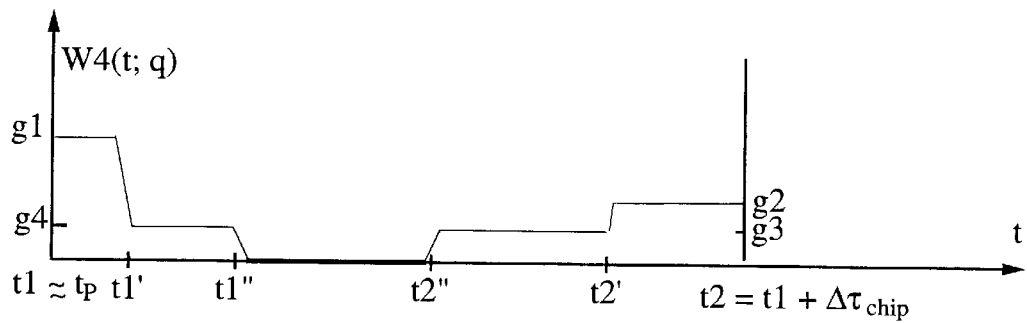
FIGS. 8B and 8C are graphical views of an autocorrelation function AC4($\tau$;x;q) (x=E, P or L) and of an autocorrelation difference function $\Delta$AC4($\tau$;q), computed using a non-uniform weighting function (five-value step function) w4(t;q) shown in FIG. 8A. difference function $\Delta$AC4($\tau$;q), computed using a non-uniform weighting function (five-value step function) w4(t;q) shown in FIG. 8A, with the respective functions AC0($\tau$) and $\Delta$AC0($\tau$).
Figure 8B:
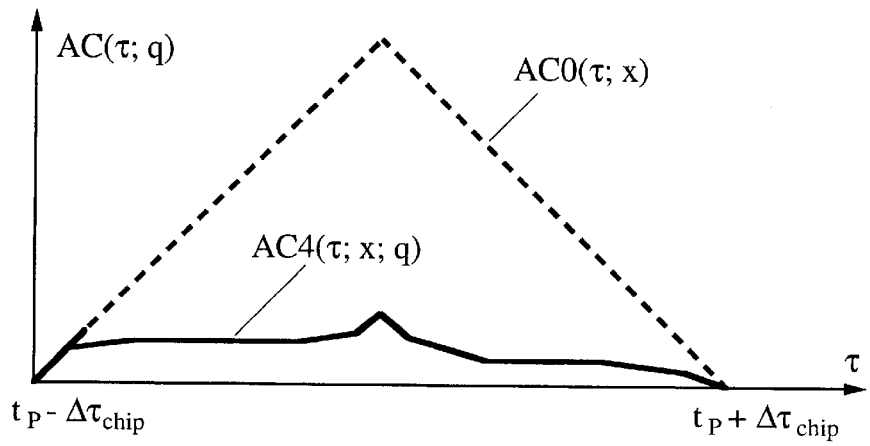
Figure 8C:
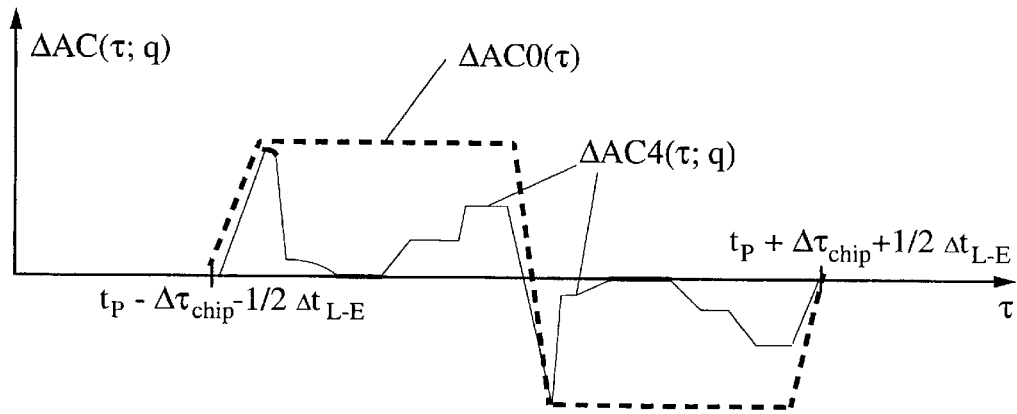

A variation on the weighting function w3(t;g1;g2;g3;t1';t2') shown in FIG. 7A is the class of five-value step functions or weighting functions w4(t;g1;g2;g3;g4;t1';t1";t2';t2") illustrated in FIG. 8A, in which the amplitude value of the weighting function w4(t;q) adjacent to the first step (t1<t<t1') is a first small number g2 (≈0), and the amplitude of the weighting function w4 adjacent to the fifth step (t2'<t<t2) is a second small number g3 (≈0). The amplitude value of the weighting function w4(t;q) drops to zero in a central region. The amplitude values g1 and g2 satisfy the constraints 0<g2<g1≦1; and the amplitude values g3 and g4 satisfy the constraints 0<g3<g4≦1. The values g1 and g4 are chosen independently of each other and may be equal or unequal, and the values g2 and g3 are chosen independently of each other. FIG. 8B compares the behavior of the behavior of the autocorrelation function AC4(τ;P;q), produced by the weighting function w4(t;q), with AC0(τ;P). FIG. 8C compares the behavior of the early-minus-late autocorrelation difference function ΔAC4(τ;q)=AC4(τ;E;q) AC4(τ;L;q), produced by the weighting function w4(t;q), with ΔAC0(τ).

Figure 9A:
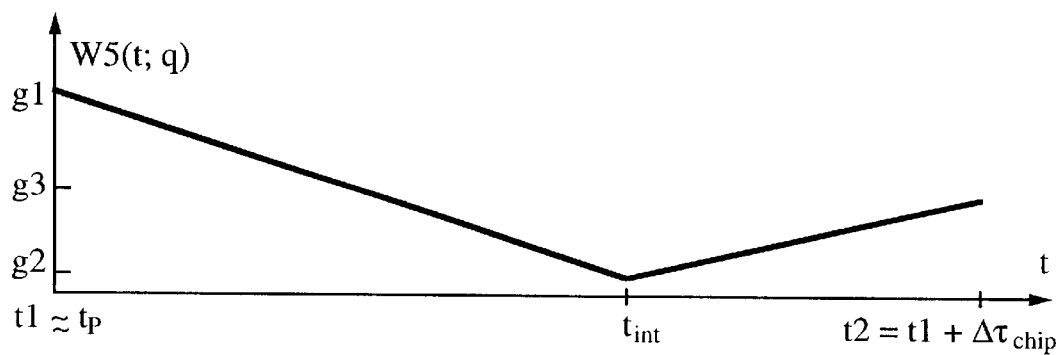
FIGS. 9B and 9C are graphical views comparing an autocorrelation function AC5($\tau$;x;q) (x=E, P or L) and comparing an autocorrelation difference function $\Delta$AC5 ($\tau$;q), computed using a non-uniform weighting function (notch function) w5(t;q) shown in FIG. 9A, with the respective functions AC0($\tau$) and $\Delta$AC0($\tau$).
Figure 9B:
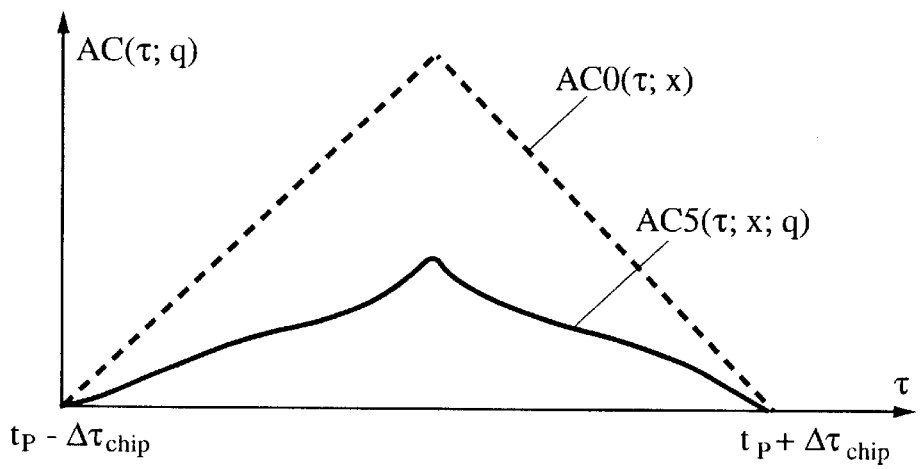
Figure 9C:
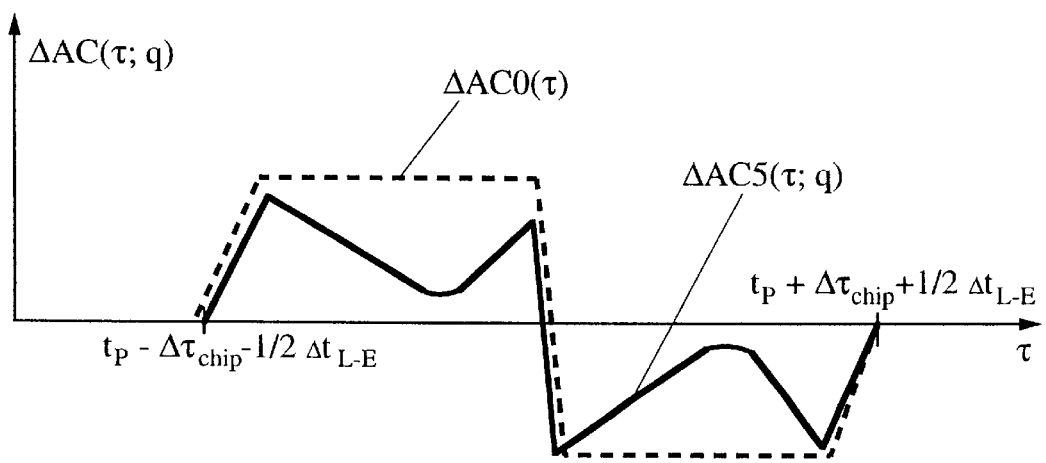

The non-uniform weighting functions considered thus far have been discontinuous at one or more values of the time variable t. FIG. 9A illustrates another suitable class of weighting functions w5(t;g1;g2;g3;t1') that is continuous at all values of t within the interval t1<t<t2 and has a triangular shape. The amplitude values g1, g2 and g3 are chosen independently of each other, and the applicable constraints are 0≦g2≦min(g1,g3). The value g2 may be chosen to be zero. FIG. 9B compares the behavior of the autocorrelation function AC5(τ;P;q), produced by the weighting function w5(t;q), with AC0(τ;P). FIG. 9C compares the behavior of the early-minus-late autocorrelation difference function $\Delta AC5(\tau;q) = AC5(\tau;E;q) - AC5(\tau;L;q)$, produced by the weighting function w5(t;q), with $\Delta AC0(\tau)$.

Figure 10A:
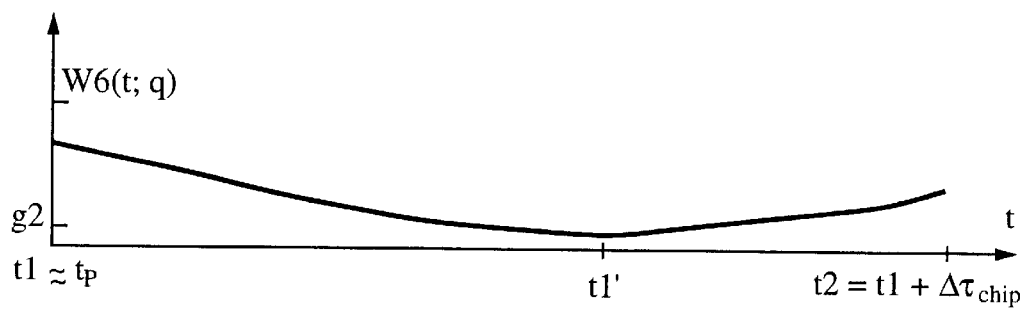
FIGS. 10B and 10C are graphical views comparing an autocorrelation function AC6($\tau$;x;q) (x=E, P or L) and comparing an autocorrelation difference function $\Delta$AC6 ($\tau$;q), computed using a non-uniform weighting function (power law function) w6(t;q) shown in FIG. 10A, with the respective functions AC0($\tau$) and $\Delta$AC0($\tau$).
Figure 10B:
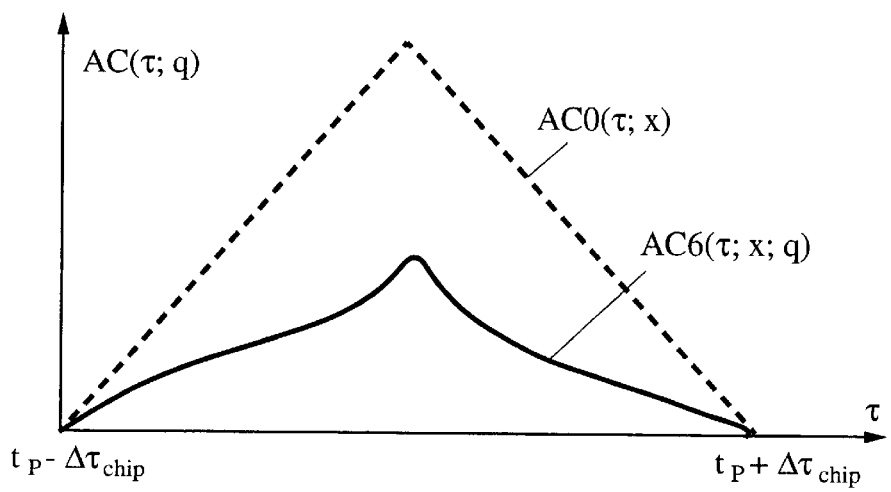
Figure 10C:
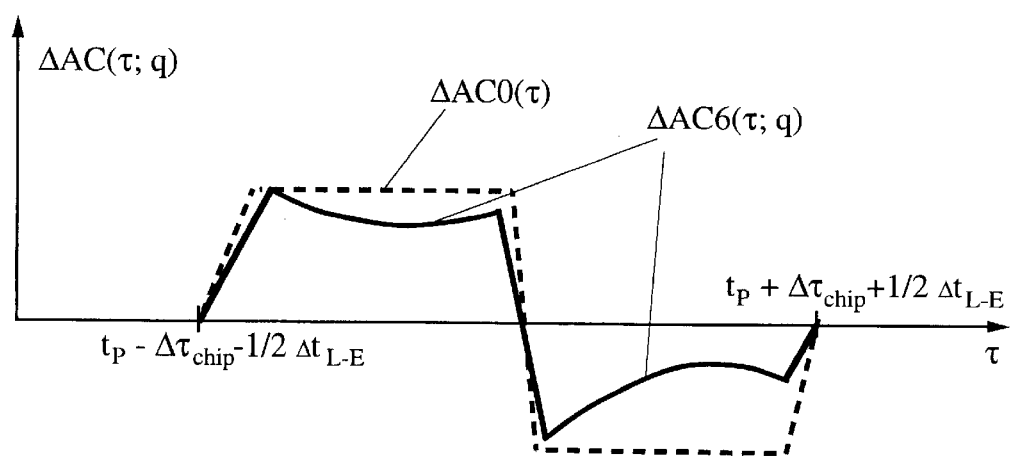

Another class of continuous weighting functions is represented by a power law weighting function $$w6(t;g1;g2;t1';m) = g1\ |t-t1'|^m + g2,\ (t1 < t < t2) \quad (5)$$

illustrated in FIG. 10A, where g1, g2 and m are selected positive constants and t1' satisfies t1<t1'<t2. FIG. 10B compares the behavior of the autocorrelation function AC6 ($\tau$;P;q), produced by the weighting function w6(t;q), with AC0($\tau$;P). FIG. 10C compares the behavior of the early-minus-late autocorrelation difference function $\Delta AC6(\tau;q) = AC6(\tau;E;q)\ AC6(\tau;L;q)$, produced by the weighting function w6(t;q), with $\Delta AC0(\tau)$.

The weighting functions w(t;E;q) and w(t;L;q) used for formation of the respective early and late autocorrelation functions need not be the same. Each of the weighting functions w(t;E;q) and w(t;L;q) can be chosen to de-emphasize some features of a multipath signal that may be present. The weighting functions w(t;E;qE) and w(t;L;qL) can be chosen independently and can, if desired, have little relationship to each other.

Figure 11A:
FIGS. 11A and 11B illustrate a pair of suitable choices of step function weighting, w7(t;qE) and w7(t;qL), for formation of the early and late autocorrelation functions, respectively.
Figure 11B:
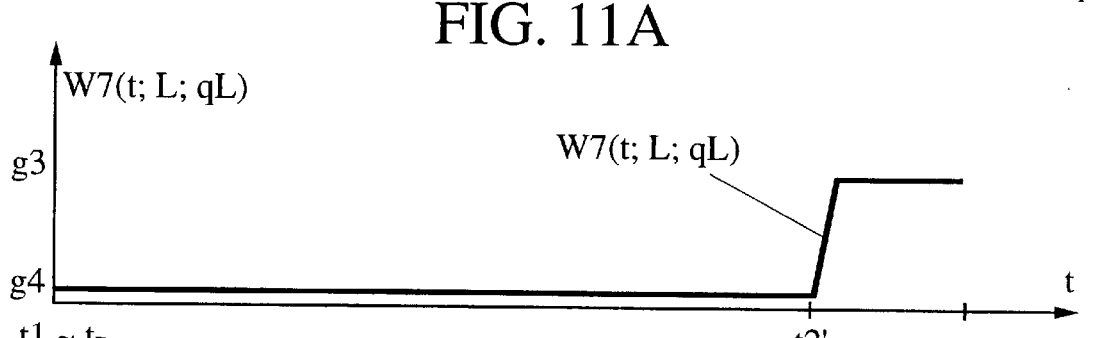
Figure 11C:
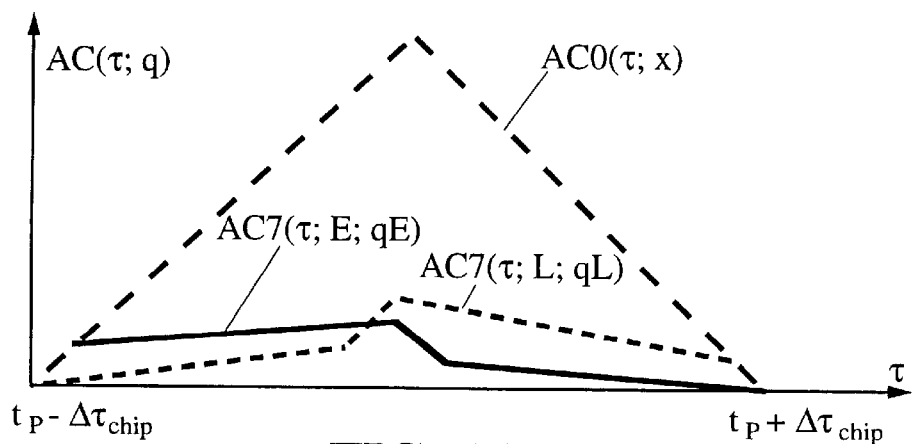
FIG. 11C shows the corresponding early and late autocorrelation functions, AC7($\tau$;E;qE) and AC7($\tau$;L;qL).
Figure 11D:
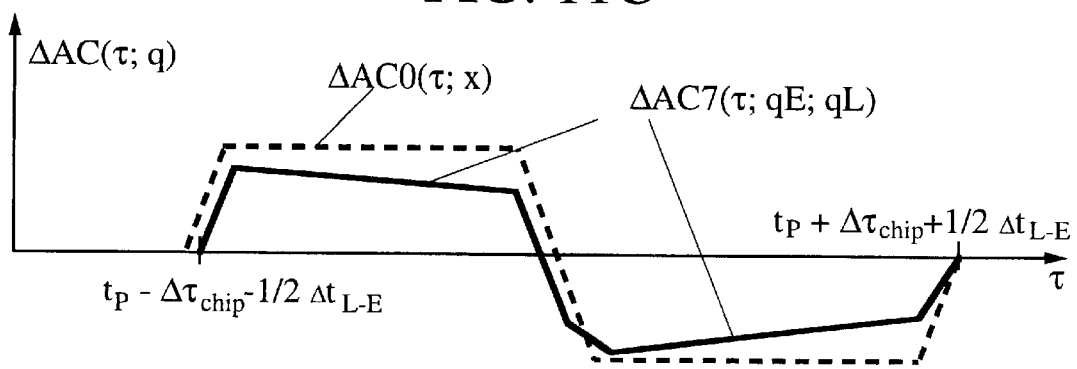
FIG. 11D compares the corresponding autocorrelation difference function $\Delta$AC7($\tau$;qE;qL) with $\Delta$AC0($\tau$).

FIGS. 11A and 11B illustrate one set of suitable choices for the weighting functions w7(t;E;g1;g2;t1') and w7(t;L;g3;g4;t2'), in which each weighting function is a two-value step function with independently chosen parameters. FIG. 11C compares the early and late autocorrelation functions AC7($\tau$;E;qE) and AC7($\tau$;L;qL) with the conventional autocorrelation function AC0($\tau$). FIG. 11D compares the corresponding early-minus-late autocorrelation difference function $\Delta AC7(\tau;qE;qL) = AC7(\tau;E;qE) - AC7(\tau;L;qL)$, computed for the choice of weighting functions w7(t;E;qE) and w7(t;L;qL) shown in FIGS. 11A and 11B, with $\Delta AC0(t)$.

The non-uniform weighting functions for the early and late autocorrelation functions can be chosen independently from any of the non-uniform weighting functions shown in FIGS. 5A, 5D, 6A, 7A, 8A, 9A, 10A and 11A/11B.

The non-uniform weighting functions wn(t;q) (n=1, 2, 3, 4, 5, 6, 7), not including w1'(t;q), used thus far may be extended to include a class of all "notch functions," defined here to include all non-negative, non-constant functions w(t;q) defined on an interval $t1 \leq t \leq t2$ with at least one interior point $t_{int}$ ($t1 < t_{int} < t2$) for which w(t;q) is monotonically decreasing for $t1 \leq t \leq t_{int}$ and is monotonically increasing for $t_{int} \leq t \leq t2$.

Figure 12A:
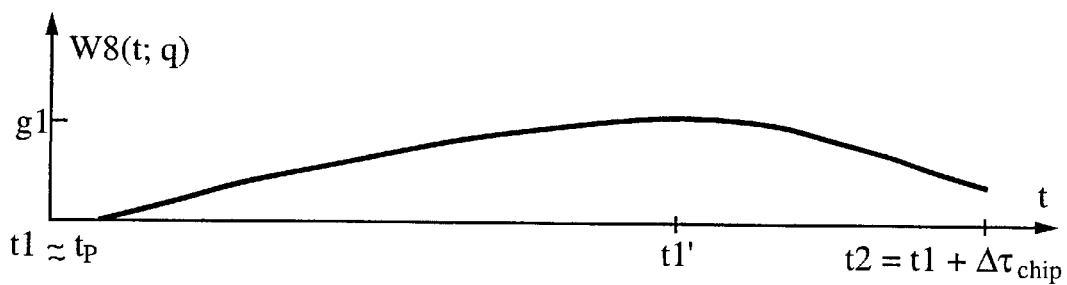
FIGS. 12B and 12C are graphical views comparing an autocorrelation function AC8($\tau$;x;q) (x=E, P or L) and comparing an autocorrelation difference function $\Delta$AC8 ($\tau$;q), computed using a non-uniform weighting function (inverted power law "anti-notch" function) w8(t;q) using $\Delta t_{L-E} \approx \Delta \tau_{chip}$ shown in FIG. 12A, with the respective functions AC0'($\tau$) and $\Delta$AC0'($\tau$).
Figure 12B:
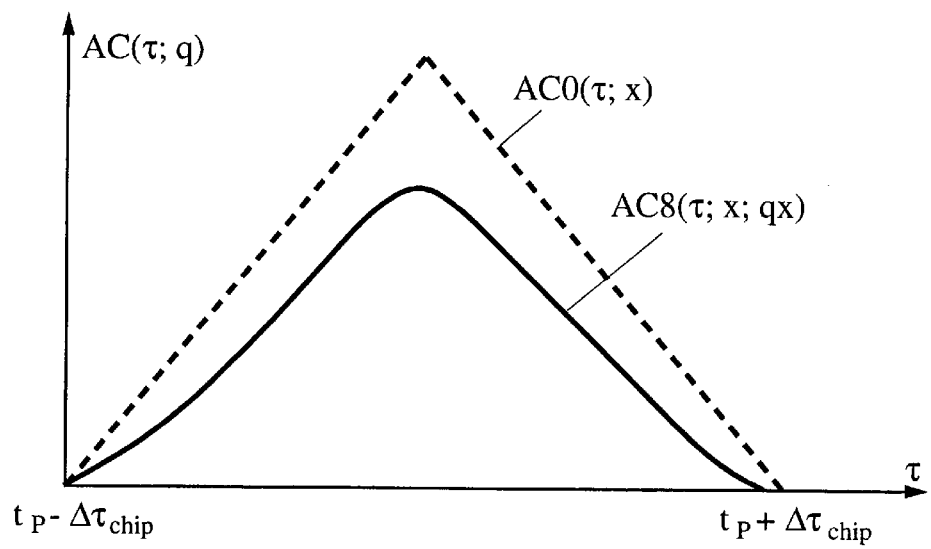
Figure 12C:
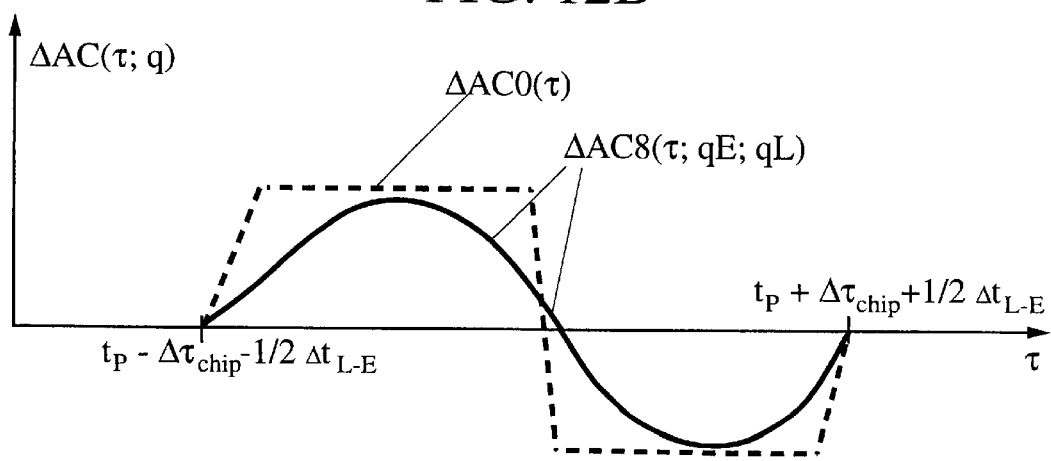

The weighting functions w(t) used for computation of the autocorrelation functions AC($\tau$;x;qx) (x=E, P or L) are not limited to notch functions. Another class of suitable weight functions here are defined by w(t;q)=g0-w(t;q;notch), referred to here as the class of all "anti-notch functions," where g0 is a constant (preferably positive) and w(t;q;notch) is any notch function.. An example of such a weight function is shown in FIG. 12A, which is a power law function of the form $$w8(t;g1;g2;t1') = g1 - g2\ |t-t1'|^m\ (t1 < t < t2), \quad (6)$$

where g1 and g2 are positive constants and m>0. FIG. 12B compares the autocorrelation function AC8($\tau$;x;qx), with AC0($\tau$). FIG. 12C compares the autocorrelation difference function $\Delta AC8(\tau;qE;qL)$, which results from use of the weighting function w8(t;q), with a modified conventional autocorrelation difference function, computed using uniform weighting, but with $\Delta t_{L-E} \approx \Delta\tau_{chip}$.

Figure 13A:
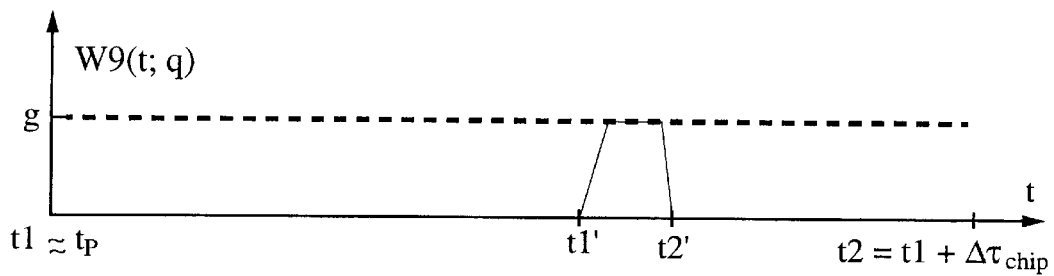
FIGS. 13B and 13C are graphical views comparing an autocorrelation function AC9($\tau$;x;q) (x=E, P or L) and comparing an autocorrelation difference function $\Delta$AC9 ($\tau$;q), computed using a non-uniform weighting function ("anti-notch" step function located at the center) w9(t;q) using $\Delta t_{L-E} \approx \Delta \tau_{chip}$, shown in FIG. 13A, with the respective functions AC0'($\tau$) and $\Delta$AC0'($\tau$).
FIGS. 13D and 13E are graphical views of early, punctual and late replicas of a direct signal, illustrating formation of a conventional autocorrelation function (FIG. 13D), and of an autocorrelation function using the non-uniform weighting function w9(t;q) of FIG. 13A (FIG. 13E) with $\Delta t_{L-E} \approx \Delta \tau_{chip}$.
Figure 13B:
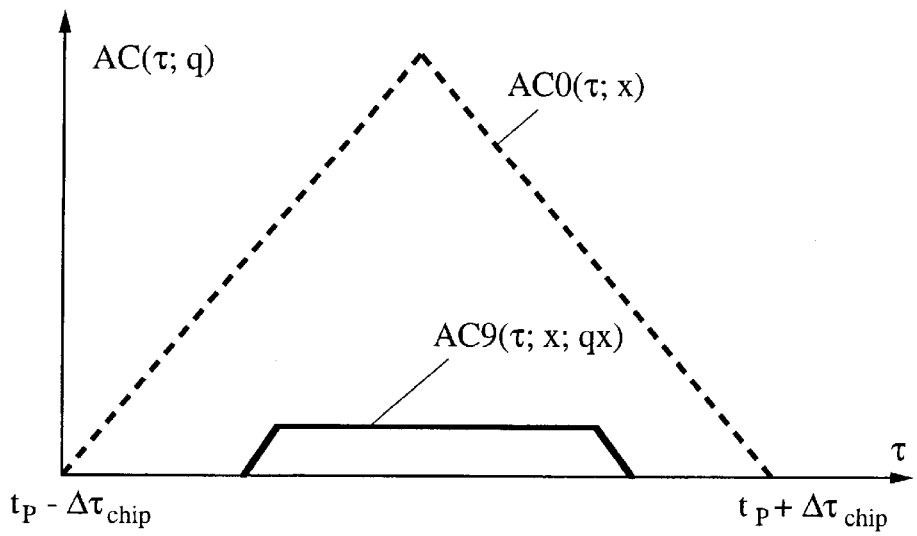
Figure 13C:
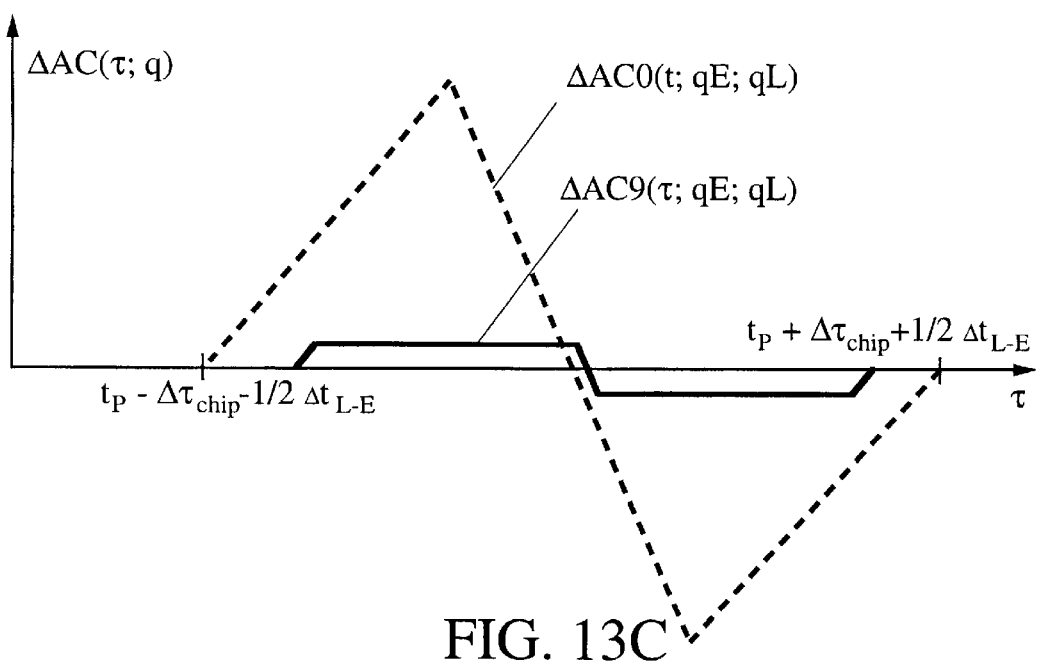

Another useful anti-notch weighting function is a single step function w9(t;g;t1';t2') shown in FIG. 13A. FIG. 13B illustrates the autocorrelation function AC9($\tau$;x;qx). FIG. 13C compares the autocorrelation difference function $\Delta AC9(\tau;qE;qL)$ (solid curve), which results from use of the weighting function w9(t;q), with a modified autocorrelation difference function $\Delta AC0'(r)$, each with correlator spacing $\Delta t_{L-E} \approx \Delta\tau_{chip}$. Note the dramatic improvement in the difference function $\Delta AC9(\tau;qE;qL)$, compared with $\Delta AC0'(T)$. The difference function $\Delta AC9(\tau;qE;qL)$ lies within the broken line envelope for the difference function $\Delta AC0'(\tau)$; that is, the magnitude $|\Delta AC9(\tau;qE;qL)|$ is always bounded by the magnitude $|\Delta AC0'(\tau)|$. Also, the slope near the zero-crossing point is unchanged. These result in dramatically reduced errors from the presence of multipath signals for $\Delta AC9(\tau;qE;qL)$ compared to $\Delta AC0'(\tau)$.

Figure 13D:
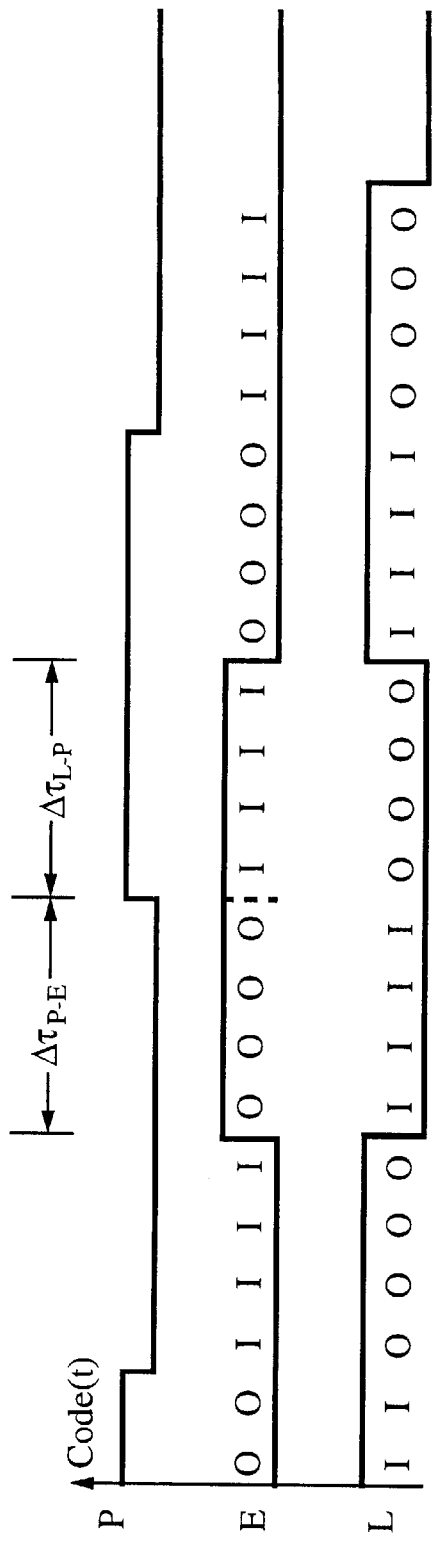

A reduction in overall noise also accrues from use of non-uniform weighting in many situations. In FIG. 13D, where the implicit uniform weighting function w0(t) is used, a representative portion of the direct signal with transitions is shown for early, punctual and late replicas, where the correlator spacing is large ($\Delta t_{P-E} = \Delta t_{L-P} = \Delta\tau_{chip}/2$), as in FIG. 13C. Sampled values from one half of the domain of each of the digital early direct signal and the digital late direct signal are in correlation with (i.e., agree with) the corresponding portion of the digital punctual direct signal (representing the incoming signal), as indicated by the letter "I" in FIG. 13D. Sampled values from the remaining one half of the domain of each of the digital early direct signal and the digital late direct signal are out of correlation with the digital punctual direct signal, as indicated by the letter "O" in FIG. 13D. The in-correlation samples contribute both signal and noise to the correlation integrals or sums. The out-of-correlation samples contribute only noise to the integrals or sums, because the early and late direct signals have zero correlation with the incoming composite signal (punctual direct signal) in these portions of the time interval. The result is, or can be, a reduction in the effective signal-to-noise ratios for the autocorrelation function AC($\tau$;x;qx) (x=E, L) and for the autocorrelation difference function $\Delta AC(\tau;qE;qL)$.

Figure 13E:
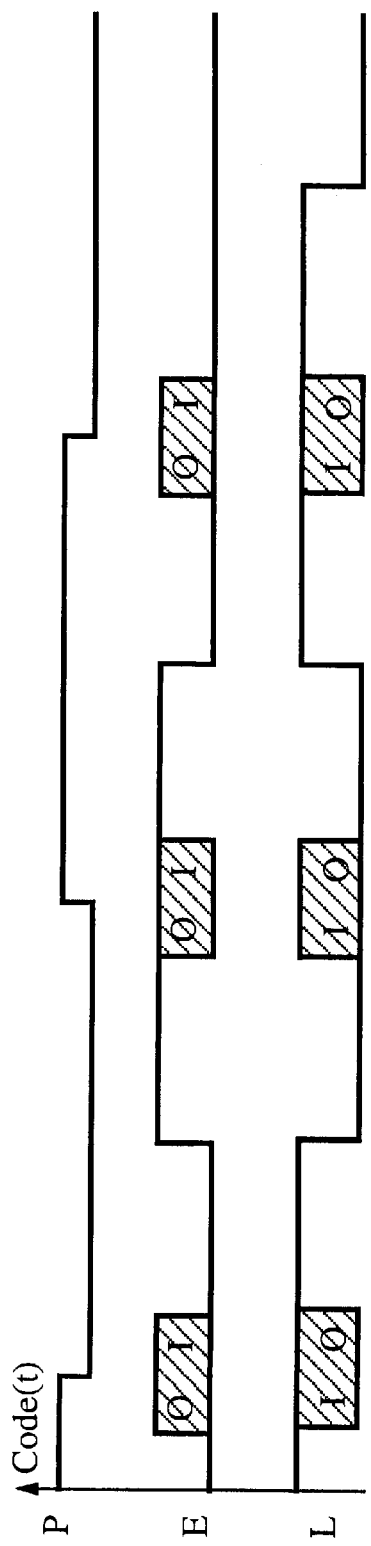

In FIG. 13E, where the non-uniform weighting function w9(t;q) is used to form the autocorrelation functions AC9($\tau$;E;qE) and AC9($\tau$;L;qL), only those sampled values within a central region C, spaced apart from the time values $t=t_n$ where bit value transitions occur for the digital early direct signal replica and digital late direct signal replica are used; and the central region C also includes time values $t=t_P$ where bit value transitions occur for the digital punctual direct signal (representing the incoming signal). The signal and the noise for the in-correlation region, indicated by "I" in FIG. 13E, are reduced approximately proportionately. No net signal contribution to the autocorrelation function AC9 ($\tau$;x;qx)) occurs for the out-of-correlation region, indicated by "O" in FIG. 13E, and the net noise contribution from this region is reduced because the temporal extent of this region is reduced vis-a-vis the out-of-correlation region ("O") in FIG. 13D. The result is a net decrease in noise and a net increase in signal-to-noise ratio for the autocorrelation function AC9($\tau$;x;qx) and for the autocorrelation difference function $\Delta AC9(\tau;qE;qL)$, as compared to the conventional autocorrelation function AC0($\tau$;x) and the conventional autocorrelation difference function $\Delta AC0'(\tau)$, respectively. Thus, in large correlator spacing systems, where the time shift difference $\Delta t_{P-E} = \Delta t_{L-P} \approx \Delta\tau_{chip}/2$, use of a non-uniform weighting function can provide improvement in both multipath signal suppression and signal-to-noise ratio.

Another surprising benefit accrues where $\Delta t_{P-E}$ and $\Delta t_{L-P}$ are relatively large, for example, $\Delta t_{P-E} = \Delta t_{L-P} \approx \Delta\tau_{chip}/2$, and the non-uniform weighting function w9(t;x;qx) is used with a "centering value", t1"=$t_c$≈(t1+t2)/2: the resulting autocorrelation difference function $\Delta AC9(\tau;qE;qL)$, computed with large correlator spacing, closely resembles the conventional autocorrelation difference function $\Delta AC0(\tau)$ where uniform weighting and small correlator spacing are used. Compare, for example, FIG. 4C with FIG. 13C.

Figure 14A:
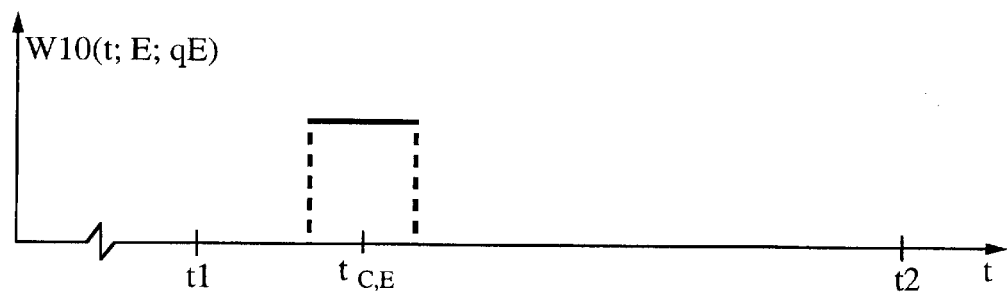
FIGS. 14D and 14H are graphical views of autocorrelation difference functions $\Delta$AC10($\tau$;qE;qL;sp), computed using "anti-notch" non-uniform weighting functions w10 (t;E;qE;sp)/w10(t;L;qL;sp) shown in FIGS. 14A/14B and in FIGS. 14E/14F, using the respective correlator spacings sp=$\Delta t_{L-E} \approx 0.5$ $\Delta \tau_{chip}$ and 1.5 $\Delta \tau_{chip}$, respectively.
FIGS. 14C and 14G show the autocorrelation functions AC10(t;x;qx;sp) for correlator spacings sp=0.5$\Delta \tau_{chip}$ and 1.5$\Delta \tau_{chip}$, respectively.
Figure 14B:
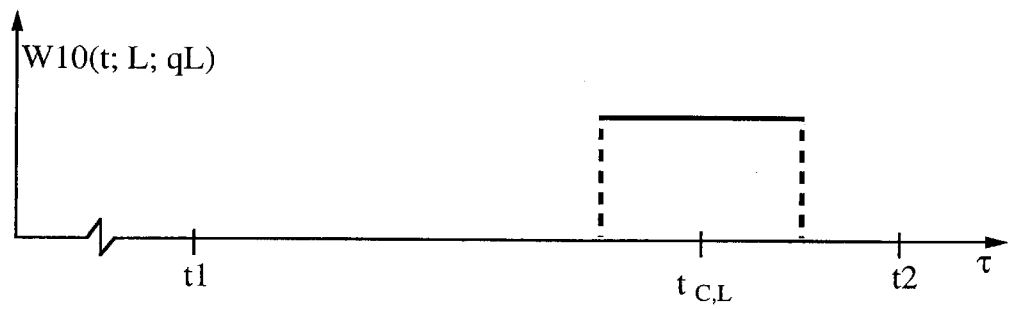
Figure 14C:
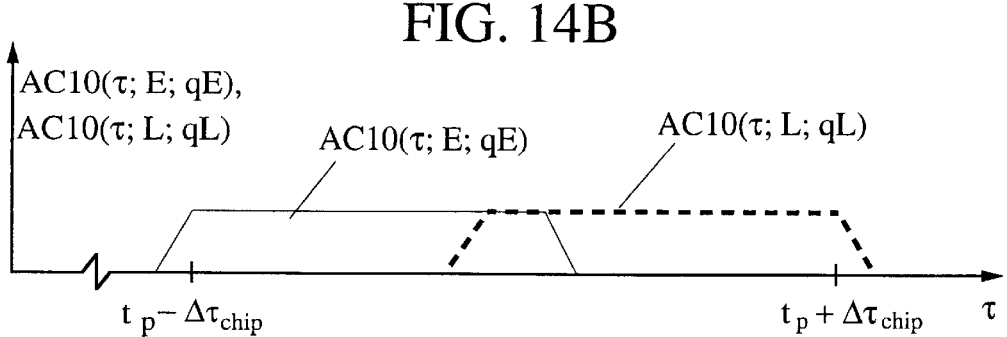
Figure 14D:
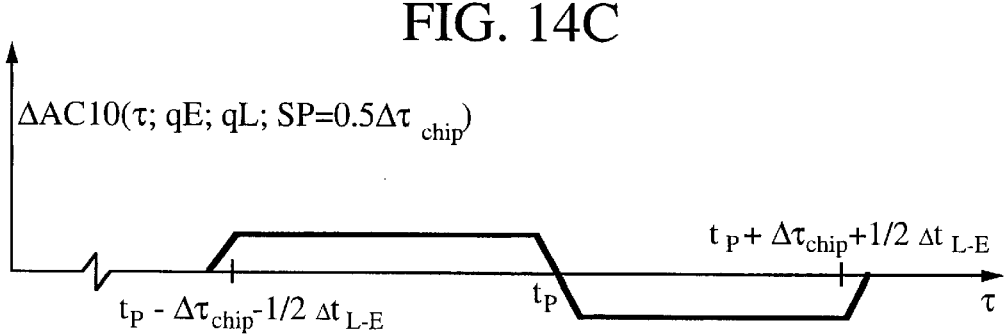
Figure 14E:
Figure 14F:
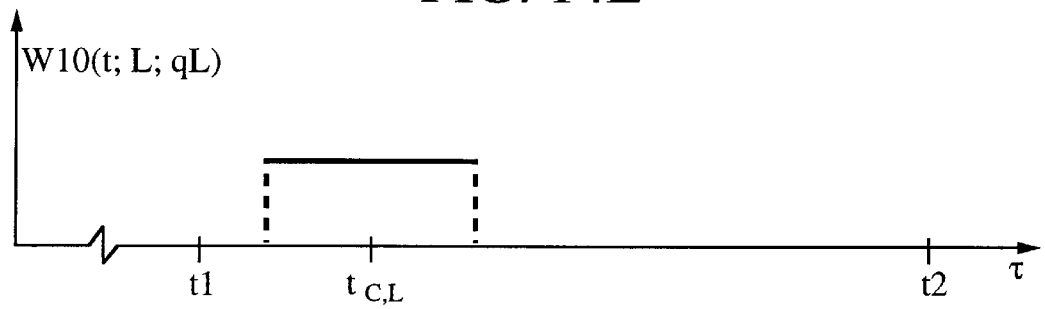
Figure 14G:
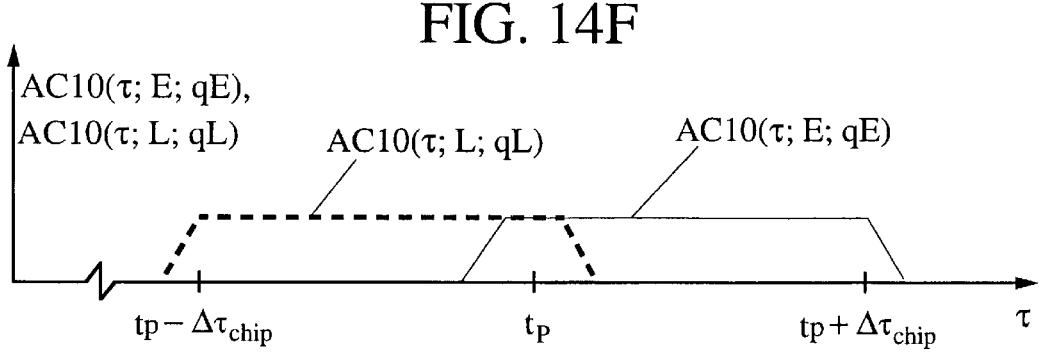
Figure 14H:
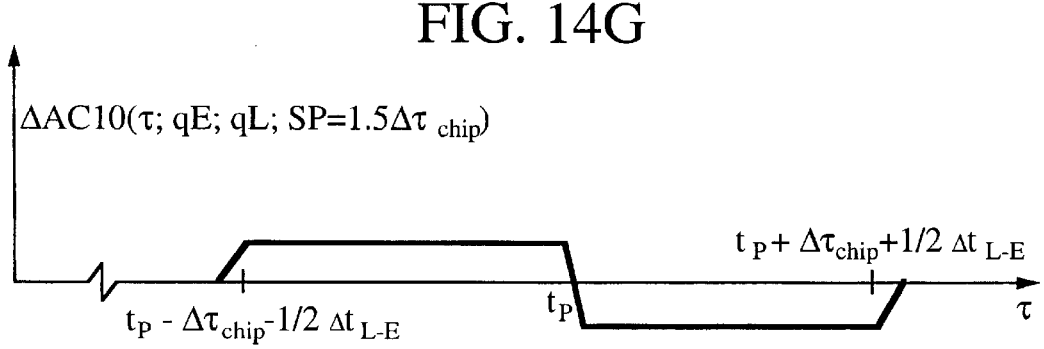

This last benefit extends to other choices of correlator spacing $\Delta t_{L-E}$, where a non-uniform weighting function similar to w9(t;x;qx) is used. Correlator spacings $\Delta t_{P-E} = \Delta t_{L-P} \approx f_{sp} \Delta \tau_{chip}$ are chosen ($0 < f_{sp} < 1.0$), and the independent anti-notch step functions w10(t;E;qE) and w10(t;L;qL) "centered" at or near the temporal values $$t = t_{c,E} = t1 + f_{sp}(t2 - t1), \qquad (7E)$$

$$t = t_{c,L} = t2 - f_{sp}(t2 - t1), \qquad (7L)$$

respectively, are used, as shown in FIGS. 14A/14B and 14E/14F. The resulting autocorrelation functions, AC10($\tau$;E;qE) and AC10($\tau$;L;qL), are shown in FIG. 14C and 14G. The autocorrelation difference functions $\Delta AC10$($\tau$;qE;qL) shown in FIGS. 14D and 14H result from these choices of weighting functions for the respective correlator spacings $\Delta t_{L-E} = 0.5 \Delta \tau_{chip}$ and $1.5 \Delta \tau_{chip}$ ($f_{sp} = 0.25$ and $0.75$, respectively). Note, again, that the autocorrelation difference functions $\Delta AC10(\tau;qE;qL)$ in FIGS. 14D and 14H closely resemble the conventional autocorrelation difference function $\Delta AC0(\tau)$ for uniform weighting and small correlator spacing. Surprisingly, correlator spacing values up to, but not including, $\Delta t_{L-E} = 2\Delta \tau_{chip}$ can be used here. For a choice $\Delta t_{L-E} = 2\Delta \tau_{chip}$, the required widths of the non-zero portions of the step functions w10(t;E;qE) and w10(t;L;qL) become 0.

Figure 15:
FIG. 15 illustrates a more general class of non-negative weighting functions that can be used.
Figure 16:
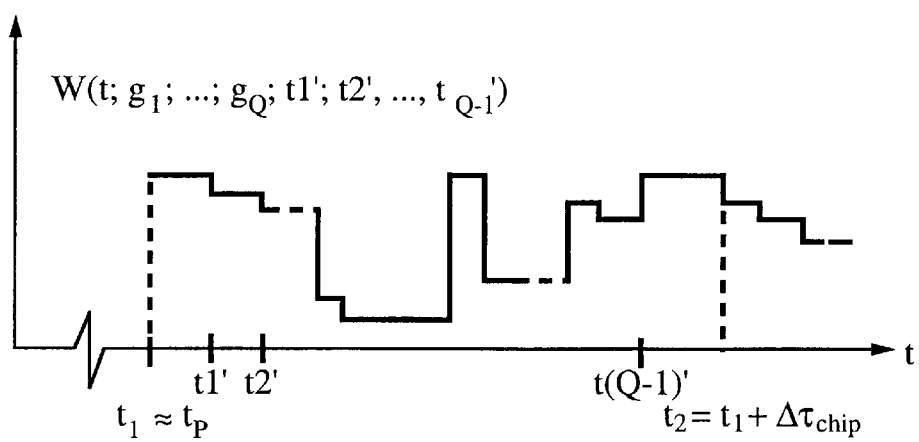
FIG. 16 illustrates use of a Q-level step function weighting function for implementation of an embodiment of the invention.

A weighting function may selected to be any non-negative, non-constant function defined on an interval $t1 \leq t \leq t2$, such as the weighting function illustrated in FIG. 15, which has continuous and discontinuous features and is neither a notch function nor an anti-notch function. FIG. 16 illustrates a suitable multi-step weighting function that can be used with the invention.

Figure 17A:
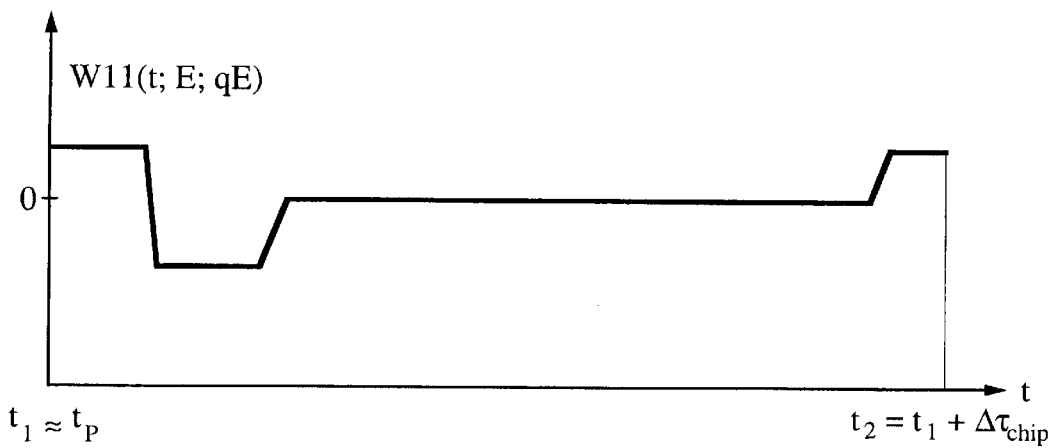
FIGS. 17A and 17B illustrate a more general class of weighting functions w11(t;q), having positive and/or negative values, that can be used, and FIG. 17C compares the autocorrelation difference function $\Delta$AC11($\tau$;qE;qL) that results from use of these weighting functions with $\Delta$AC0($\tau$).
Figure 17B:
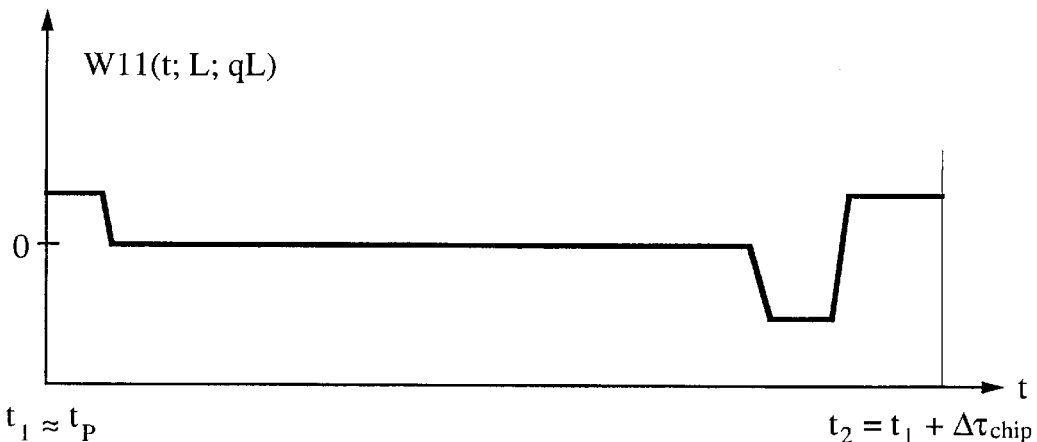
Figure 17C:
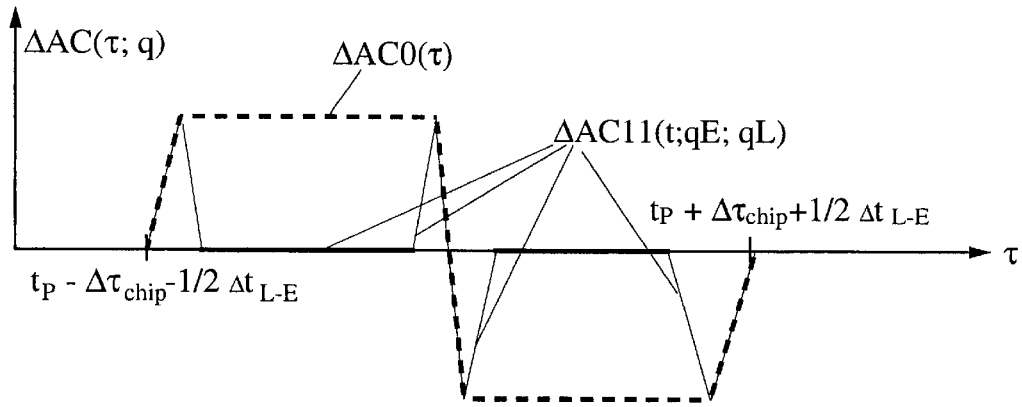

More generally, non-uniform weighting functions w11(t;E;qE) and w11(t;L;qL), defined on an interval $t1 \leq t \leq t2$, may include positive and negative amplitude values, as illustrated in FIGS. 17A and 17B. The corresponding autocorrelation difference function $\Delta AC11(\tau;qE;qL)$ is shown in FIG. 17C, and compared with $\Delta AC0(\tau)$.

Figure 18:
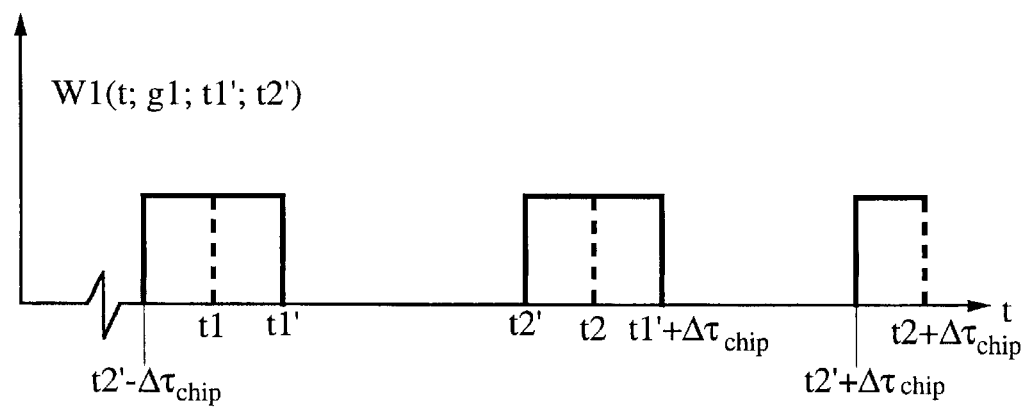
FIG. 18 illustrates an alternate characterization of the weighting function w1(t;q) shown in FIG. 5A.

The non-uniform weighting functions w(t;q) used for illustration in FIGS. 5A, 5D, 6A, 7A, 8A, 9A, 10A, 11A/11B, 12A, 13A, 14A/14B, 14E/14F, 15, 16 and 17A/17B have been taken to be periodic with period=$\Delta \tau_{chip}$, as indicated by Eq. (3). For example, the notch weighting function w1(t;q) shown in FIG. 5A may also be represented in a periodic representation shown in FIG. 18, where t1−(t2−t2')=t2'−$\Delta \tau_{chip}$.

Because the autocorrelation function AC($\tau$;q) computed in Eq. (4A) or (4B) extends over a time interval of length $N\Delta \tau_{chip} \gg \Delta \tau_{chip}$, the constraint on weighting function periodicity for a suitable non-uniform weighting function w(t) set forth in Eq. (3) can be relaxed to $$w(t;q) = w(t + n M\Delta \tau_{chip}; q) \quad (n = 0, \pm 1, \pm 2, \ldots), \qquad (8)$$

where M is a positive integer that is no greater than N. This weighting function w(t;q) will have periodicity $M\Delta \tau_{chip}$ rather than $\Delta \tau_{chip}$, with M>1.

In the preceding examples of weighting functions, the requirements $$\Delta t_{P-E} = \Delta t_{L-P} = \Delta t_{L-E}/2 \qquad (9)$$

have been imposed on the early-minus-late correlator spacing intervals. These conditions can also be relaxed in appropriate situations. However, if the conditions in Eq. (9) are relaxed, the zero crossing point for the autocorrelation difference function $\Delta AC(\tau;qE;qL)$ may not coincide with the desired tracking point $\tau=tp$. Further, imposing the requirements of Eq. (9) does not guarantee that the zero crossing or tracking point for the autocorrelation difference function is always at the "center" or peak value for the autocorrelation.

Implementation

Figure 19:
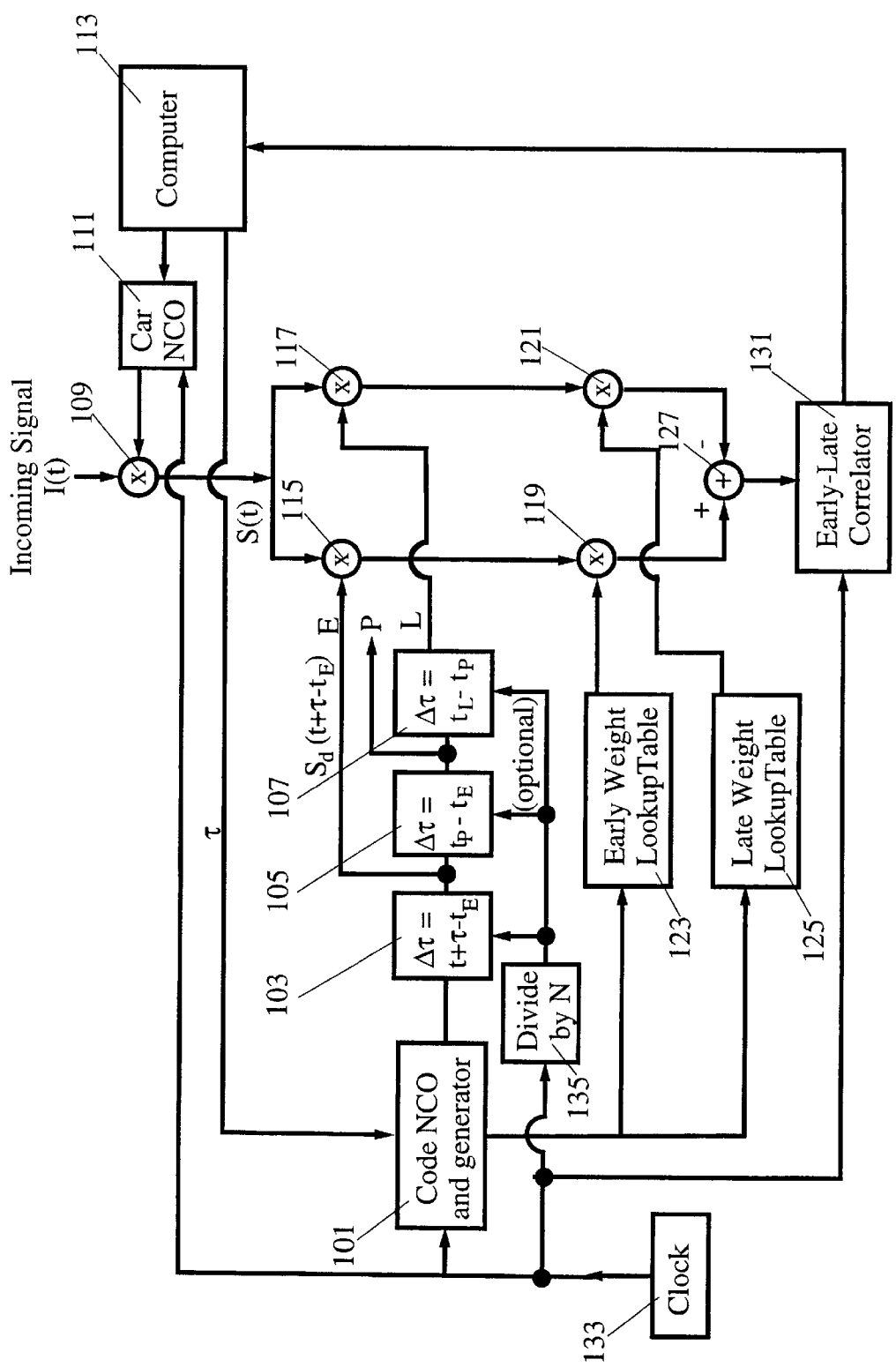
FIGS. 19, 20, 22, 23 and 24 illustrate five embodiments of apparatus for implementing the invention.

In a first implementation of the non-uniform weighting approach discussed above, lookup tables are provided, as shown in FIG. 19, for a sequence of values {w($t_n$;q)} (n=1, 2, ...) of a weighting function at a sequence of time values $\{t_n\}_n$ on a time interval t1<t<t2. Interpolation is used for time values t between two consecutive time values $t_n$ and $t_{n+1}$, if desired. If the number P of distinct time values $\{t_n\}$ (n=1, 2, ...) in the lookup table on the contribution time interval t1<t<t1+M $\Delta \tau_{chip}$ satisfies $2^{J-1} < P \leq 2^J$ and the number Q of distinct weighting function values (resolution) satisfies $2^{K-1} < Q \leq 2^K$, where J, K and M are selected positive integers, at most J bits are required to specify a "bin" defined by the time interval sequence $\{t_n\}$, and at most K bits are required to specify a weighting function amplitude that corresponds to that time interval bin in the lookup table. For example, a lookup table could provide up to 1024 distinct time interval bins (J=10) and have a resolution of up to 32 weighting function values (K=5). After carrier mixing, each sampled incoming signal value is then multiplied by values $S_d(t+\tau-t_x)$ (x=E, L) of the digital early direct signal replica and digital late direct signal replica, and is then multiplied by the corresponding weighting functions w(t;x;qx) (x=E, L) taken from the appropriate lookup table bin, to determine the weighted contribution to AC($\tau$;E;qE) and to AC($\tau$;L;qL) of this sampled incoming signal value.

In FIG. 19, a code phase numerically controlled oscillator (NCO) and code generator module 101 provides a sequence of time values $\{t_n\}_n$ (n=1, 2, ...) that is sequentially fed to an early replica time delay module 103, to a punctual replica time delay module 105 (optional), and to a late replica time delay module 107. The time delay modules 103, 105 and 107 issue a digital early replica direct signal $S_d(t+\tau-t_E)$, a digital punctual replica direct signal $S_d(t+\tau-t_P)$ (optional) and a digital late replica direct signal $S_d(t+\tau-t_L)$, as their respective output signals, where $\tau$ is a time shift value. An incoming analog composite signal I(t) is received at a first input terminal of a multiplier module 109. A second input terminal of the multiplier module 109 receives a frequency conversion signal from a carrier phase NCO module 111, with a conversion frequency sufficient to convert the output signal of the multiplier module to a digital baseband composite signal s(t). The carrier phase NCO module 111 is controlled by a computer or microprocessor 113, and the code phase NCO module 101 receives from the computer 113 a selected time shift value t that is used to determine the digital replica signals $S_d(t+\tau-t_x)$ (x=E, P, L). The baseband-converted digital composite signal s(t) is received at a first input terminal of each of two multiplier modules 115 and 117. The digital early replica signal and digital late replica signal $S_d(t+\tau-t_E)$ and $S_d(t+\tau-t_L)$ are received at a second input terminal of the respective multiplier modules 115 and 117. The multiplier modules 115 and 117 issue the respective output digital signal products s(t)$S_d$(t+$\tau$-$t_E$) and s(t)$S_d$(t+$\tau$-$t_L$) that are received at first input terminals of multiplier modules 119 and 121, respectively.

The sequence of time values $\{t_n\}_n$ issued by the code phase NCO module 101 is also received at an early weighting function lookup table 123 and at a late weighting function lookup table 125. The lookup tables 123 and 125 each receive a time value t=$t_n$, determine that this time value $t_n$ lies in a (unique) time interval bin $T_r \leq t < T_{r+1}$, and issue weighting function values w($t_n$;E;qE) and w($t_n$;L;qL), dependent upon the respective parameter values qE and qL, corresponding to the time value t=$t_n$. The weighting function values w($t_n$;E;qE) and w($t_n$;L;qL) are received at second input terminals of the respective multiplier modules 119 and 121. A difference of the output signals, w($t_n+\tau-t_E$;E;qE)s($t_n$)$S_d$($t_n+\tau-t_E$) and w($t_n+\tau-t_L$;L;qL)s($t_n$)$S_d$($t_n+\tau-t_L$), of the respective multiplier modules 119 and 121 is computed in a difference module 127. The difference $$\Delta s_{E-L}(t_n) = w(t_n+\tau-t_E;E;qE)s(t_n)S_d(t_n+\tau-t_E) - w(t_n+\tau-t_L;L;qL)s(t_n)S_d(t_n+\tau-t_L), \quad (10)$$

is received and accumulated by an early-minus-late correlator tracking module 131. The accumulated value of the differences $\Delta s_{E-L}(t_n)$ is received and analyzed by the computer 113 to determine a zero crossing or tracking point, using the signum and/or the magnitude of the tracking error to drive the time shift value t toward the zero crossing or tracking point in a closed feedback loop as shown. The tracking error is proportional to the accumulated sum or integral of the values $\Delta s_{E-L}(t_n)$ over the contribution time interval for the autocorrelation function. A master clock 133 provides timing for the code phase NCO and code generator module 101, for the time delay modules 103, 105 and 107, for the carrier phase NCO module 111, and for the early-late correlator 131. Optionally, the clock signal from the clock 133 is passed through a divide-by-N module 135 before the clock signal is received by the time delay modules 103, 105 and 107.

In a second implementation, also illustrated by FIG. 19, specification of a weighting function time interval that has J bits uses only an uppermost J1 most significant bits (MSBs), where $1 \leq J1 < J$, and is provided by the early and late lookup tables 123 and 125. In effect, the $2^{J-J1}$ weighting function time intervals that are represented by the lowermost J–J1 least significant bits (LSBs) are lumped together in a single weighting function time interval bin having one representative time interval value for that group of time intervals. One advantage of this approach is that a smaller lookup table, specified by at most $2^{J1}$ time interval bins and at most $2^K$ weighting function values, will suffice for this representation. Formation and accumulation of the signal product values w($t_n+\tau-t_x$;x;qx)s($t_n$)$S_d$($t_n+\tau-t_x$) (x=E, L) proceeds as in the first implementation using the apparatus of FIG. 19.

Figure 20:
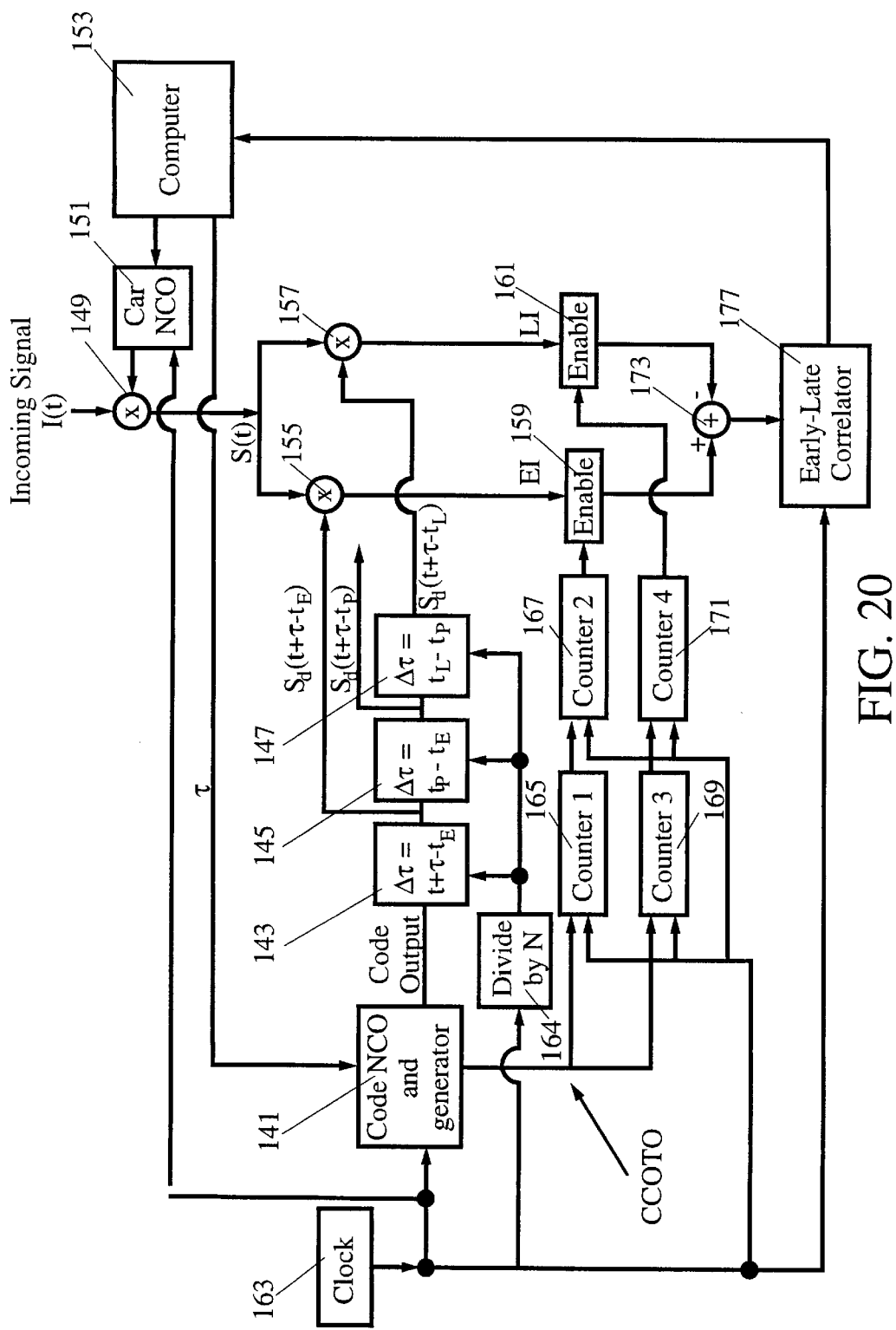

A third implementation is illustrated in FIG. 20, where only two time interval bins are used (J=1) and only two distinct weighting function values (one zero, one non-zero) are used (K=1). A code phase NCO and code generator module 141, an early replica time delay module 143, a punctual replica time delay module 145, a late replica time delay module 147, a multiplier module 149, a carrier phase NCO module 151, a computer 153, and two multiplier modules 155 and 157 behave just as their analogues, the code phase NCO module 101, the early replica time delay module 103, the punctual replica time delay module 105, the late replica time delay module 107, the first multiplier module 109, the carrier phase NCO module 111, the computer 113, and the two multiplier modules 115 and 117, behave in FIG. 19. The output signals from the multiplier modules 155 and 157 are received at first input terminals of the respective enable modules 159 and 161. The code phase NCO module 141 also issues a code chip output transition occurrence ("CCOTO") signal. The CCOTO signal is a periodic pulse signal that goes high (or goes low) at the beginning of each digital direct signal chip, of length $\Delta t = \Delta\tau_{chip}$, for a time interval of length $\Delta t$(clock) and then goes low (or goes high) for the remainder of that chip. The CCOTO signal is received by a first counter 165 and a third counter 169, both driven by a master clock 163 with clock pulses of length $\Delta t$(clock).

Figure 21:
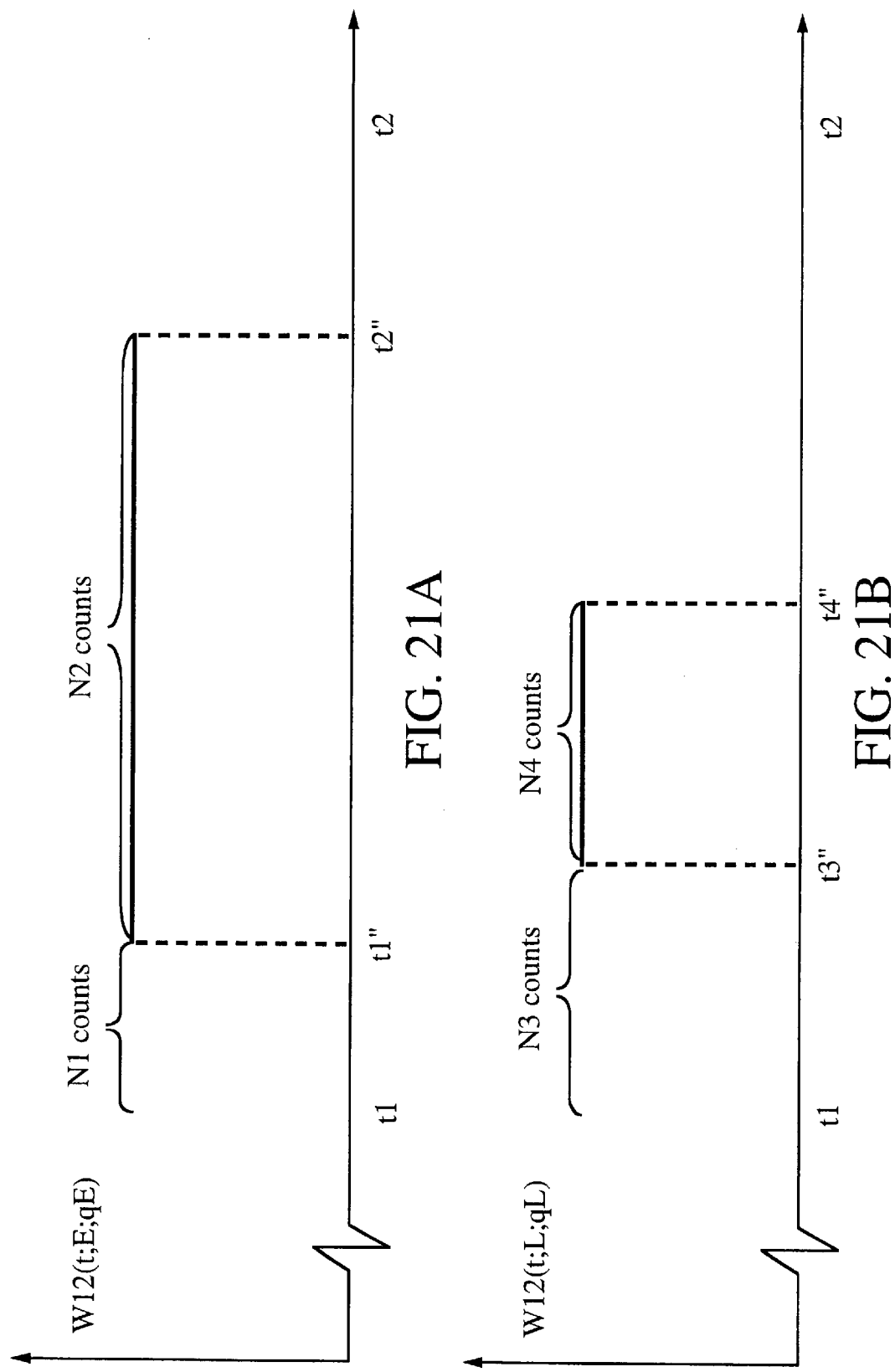
FIGS. 21A and 21B illustrate suitable weighting functions that can be generated using the implementations in FIGS. 20, 22, 23 and 24.

Receipt of a CCOTO signal by the first counter 165 causes the first counter to accumulate a first selected number N1 of clock pulses from the master clock 163. When the selected clock pulse count N1 is reached, corresponding to a first weighting time interval of length $\Delta t1=t1''-t1$, the first counter 165 is reset and a second counter 167, also driven by clock pulses from the master clock 163, is triggered and begins to accumulate clock pulses. The second counter 167 accumulates a second selected number N2 of clock pulses, corresponding to a second weighting time interval of length $\Delta t2=t2''-t1''$, and then resets. The first counter 165 is triggered by the next CCOTO and begins accumulating at the time t=t2 ($\geq t2''$), and the preceding process is repeated. If the weighting function has a non-zero weight of g (e.g., g=1) for the interval $t1'' \leq t \leq t2''$ and a weight of 0 elsewhere in the interval $t1 \leq t < t2$ (with periodic extensions to the intervals $t1+n\Delta\tau_{chip} \leq t < t2+n\Delta\tau_{chip}$, for n=0, +1, +2, ... ), the periodic weighting function w12(t;E;qE) shown in FIG. 21A is obtained.

Receipt of a CCOTO signal by the third counter 169 causes the third counter to accumulate a third selected number N3 of clock pulses from the master clock 163. When the selected clock pulse count N3 is reached, corresponding to a third weighting time interval of length $\Delta t3=t3''-t1$, the third counter 169 is reset and a fourth counter 171, also driven by the master clock 163, is triggered and begins to accumulate clock pulses. The fourth counter 171 accumulates a fourth selected number N4 of clock pulses, corresponding to a fourth weighting time interval of length $\Delta t4=t4''-t3''$, and then resets. The third counter 169 is triggered by the next CCOTO and begins accumulating at the time t=t2 ($\geq t4''$), and the preceding process is repeated. If the weighting function has a weight of g for the interval $t3'' \leq t \leq t4''$ and a weight of 0 elsewhere in the interval $t1 \leq t < t2$ (with periodic extensions to the intervals $t1+n\Delta\tau_{chip} \leq t < t2+n\Delta\tau_{chip}$ for n=0, ±1, ±2, ... , as before), the periodic weighting function w12(t;L;qL) shown in FIG. 21B is obtained. Preferably, (N1+N2) $\Delta t$(clock) $\leq \Delta\tau_{chip}$ and (N3+N4) $\Delta t$(clock) $\leq \Delta\tau_{chip}$.

Signals generated by the second and fourth counters 167 and 171 are received as input signals at second input terminals of the respective enable modules 159 and 161. The input signals (high or low) received from the counters 167 and 171 represent the weighting functions w(t;E;qE) and w(t;L;qL), where each weighting function w has two values, 0 and g (g≠0) These input signals enable or, alternatively, inhibit the signal products s($t_n$)$S_d$($t_n+\tau-t_E$) and s($t_n$)$S_d$($t_n+\tau-t_L$) received from the multiplier modules 155 and 157. The output signals from the enable modules 159 and 161 are the equivalent of the weighted signal product values w($t_n+\tau-t_E$;E;qE)s(tn)$S_d$($t_n+\tau-t_E$) and w($t_n+\tau-t_L$;L;qL)s($t_n$)$S_d$($t_n+\tau-t_L$). A notch weighting function, such as w1(t;x;qx) in FIG. 5A, can be obtained from an anti-notch function, FIG. 21A or 21B, by reversing the sense of the enable input signals for the enable modules 159 and 161. Output signals from the respective enable modules 159 and 161 are differenced in a difference module 173, and a resulting difference signal $\Delta s_{E-L}(t_n)$ is received and accumulated by an early-minus-late correlator tracking module 177, and the accumulated difference $\Delta s_{E-L}(t_n)$ is received and analyzed by the computer 153 to determine a zero crossing or tracking point, using the signum and/or the magnitude of the tracking error to drive the time shift value t toward the zero crossing or tracking point in a closed feedback loop as shown. Again, the tracking error is proportional to the accumulated sum or integral of the values $\Delta s_{E-L}(t_n)$ over the contribution time interval for the autocorrelation function. The master clock 163 provides timing for the code phase NCO and code generator module 141, for the time delay modules 143, 145 and 147, for the carrier phase NCO module 151, for the early-late correlator 177, and for the counters 165, 167, 169 and 171. Optionally, the clock signal from the clock 163 is passed through a divide-by-N module 164 before the clock signal is received by the time delay modules 143, 145 and 147.

Figure 22:
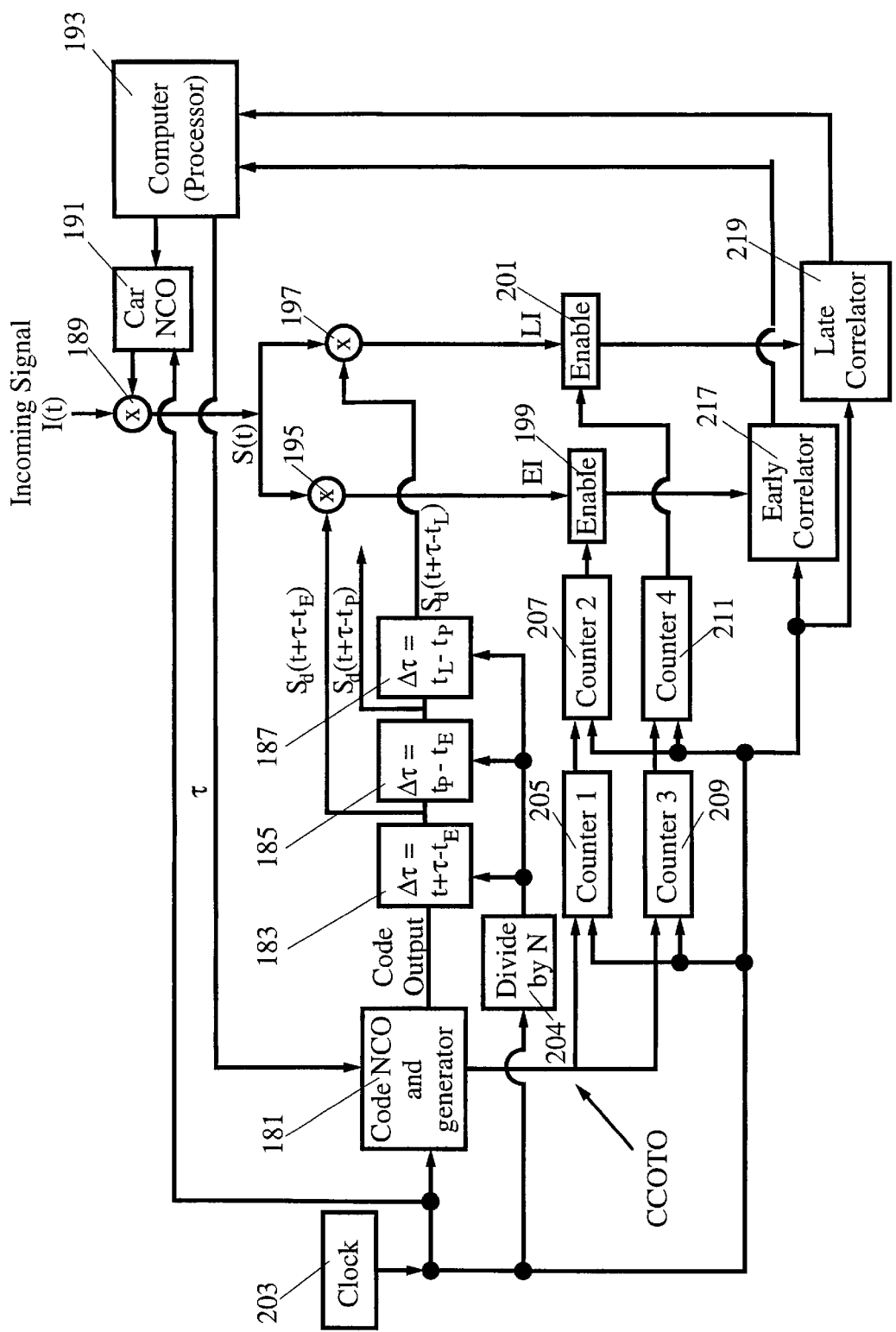

Apparatus suitable for implementing a fourth implementation is shown in FIG. 22. A code phase NCO and code generator module 181, an early replica time delay module 183, a punctual replica time delay module 185, a late replica time delay module 187, a multiplier module 189, a carrier phase NCO module 191, a computer 193, two multiplier modules 195 and 197, a first enable module 199, a second enable module 201, a master clock 203, a first counter 205, a second counter 207, a third counter 209, and a fourth counter 211 behave as their corresponding components behave in FIG. 20. The (equivalent) output signals, $w(t_n+\tau-t_E;E;qE)s(t_n)S_d(t_n+\tau-t_E)$ and $w(t_n+\tau-t_L;L;qL)s(t_n)S_d(t_n+\tau-t_L)$, of the respective enable modules 199 and 201 are received by an early correlator module 217 and a late correlator module 219 for accumulation, and the output accumulation signals are received by the computer 193. The computer 193 forms and analyzes the difference $\Delta s_{E-L}(t_n)$ of the signals received from the correlator modules 217 and 219 to determine a zero crossing or tracking point, using the signum and/or the magnitude of the tracking error to drive the time shift value $\tau$ toward the zero crossing or tracking point in a closed feedback loop as shown. Again, the tracking error is proportional to the accumulated sum or integral of the values $\Delta s_{E-L}(t_n)$ over the contribution time interval for the autocorrelation function. A master clock 203 provides timing for the code phase NCO and code generator module 181, for the time delay modules 183, 185 and 187, for the carrier phase NCO module 191, for the early correlator 217 and the late correlator 219, and for the counters 205, 207, 209 and 211. Optionally, the clock signal from the clock 203 is passed through a divide-by-N module 204 before the clock signal is received by the time delay modules 183, 185 and 187.

Figure 23:
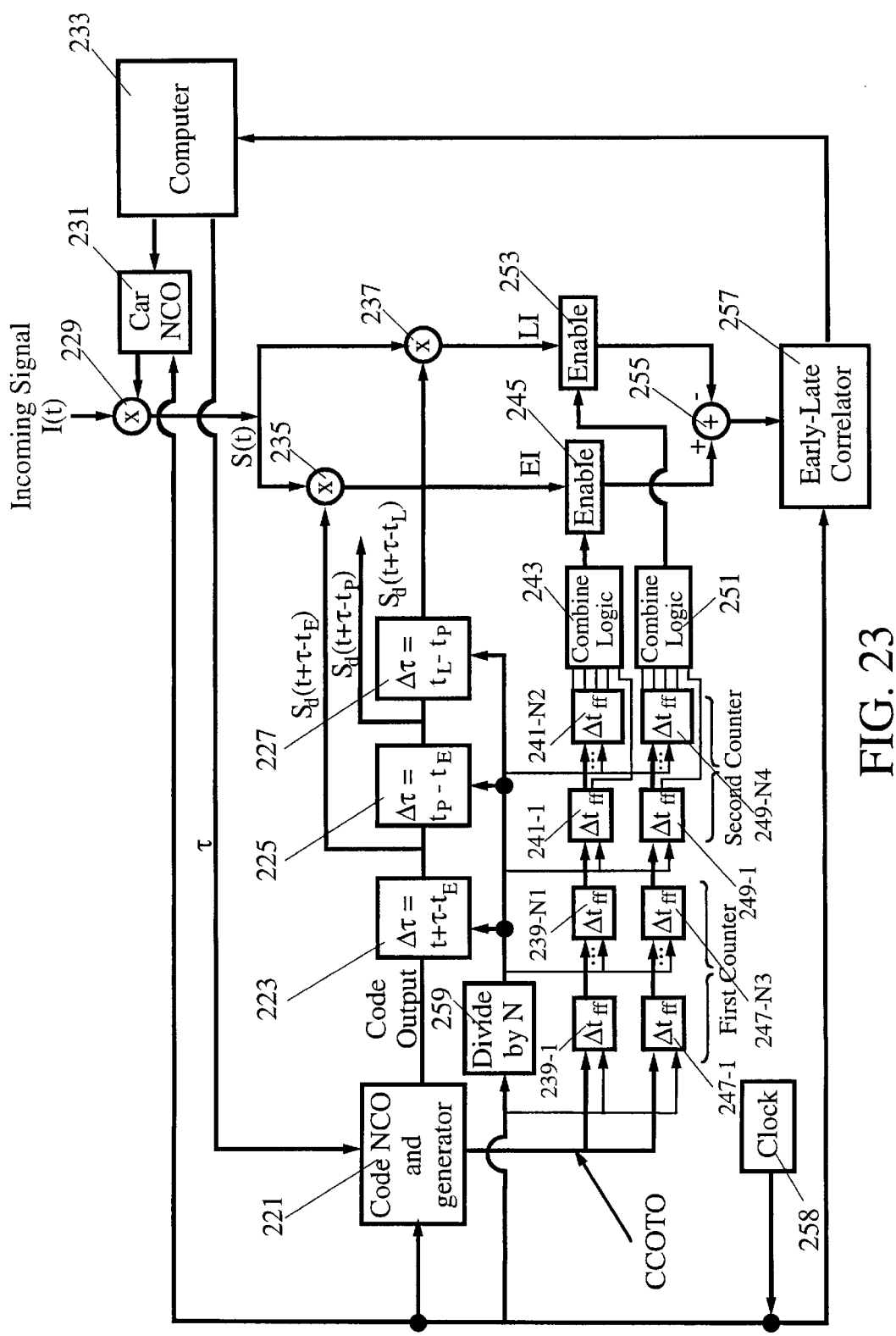

Apparatus suitable for implementing a fifth implementation is shown in FIG. 23. A code phase NCO and code generator module 221, an early replica time delay module 223, a punctual replica time delay module 225, a late replica time delay module 227, a multiplier module 229, a carrier phase NCO module 231, a computer 233, and two multiplier modules 235 and 237 behave as do the corresponding components in FIG. 20. The fifth implementation also includes a first sequence of flipflops 239-1, . . . , 239-N1, a second sequence of flipflops 241-1, . . . , 241-N2, a first combinatorial logic block 243, a first enable module 245, a third sequence of flipflops 247-1, . . . 247-N3, a fourth sequence of flipflops 249-1, . . . , 249-N4, a second combinatorial logic block 251, a second enable module 253, a difference module 255, and an early-minus-late correlator 257. Each of the two combinatorial logic blocks 243 and 251 may be an OR gate, a NAND gate or some other suitable combination of logic gates.

Each flipflop has a fixed time delay $\Delta t(clock)$, and each of the four sequences of flipflops serves as a counter with a count of N1$\Delta t$(clock), N2$\Delta t$(clock), N3$\Delta t$(clock) or N4$\Delta t$(clock). The first and second flipflop sequences together form a weighting function $w(t_n+\tau-t_E;E;qE)$, and the third and fourth flipflop sequences together form a weighting function $w(t_n+\tau-t_L;L;qL)$, where each weighting function w has two values, 0 and g (g$\neq$0).

Output signals, $w(t_n+\tau-t_E;E;qE)s(tn)S_d(t_n+\tau-t_E)$ and $w(t_n+\tau-t_L;L;qL)s(tn)S_d(t_n+\tau-t_L)$, are formed by the respective enable modules 245 and 253 and are received by a difference module 255 that forms a difference signal, $\Delta s(t_n)_{E-L}$ as an output signal. The output signal from the difference module 255 is received by an early-minus-late correlator module 257 that accumulates the difference values $\Delta s_{E-L}(t_n)$ and issues this accumulation as an output signal. The output signal from the correlator module 257 is received by the computer 233. The computer 233 forms and analyzes this output signal to determine a zero crossing or tracking point, using the signum and/or the magnitude of the tracking error to drive the time shift value t toward the zero crossing or tracking point in a closed feedback loop as shown. Again, the tracking error is proportional to the accumulated sum or integral of the difference signal values $\Delta s_{E-L}(t_n)$ over the contribution time interval for the autocorrelation function. A master clock 258 provides timing for the code phase NCO and code generator module 221, for the time delay modules 223, 225 and 227, for the carrier phase NCO module 231, for the early-late correlator 257, and for the flipflops 239-w (w=1, . . . , N1), 241-x (x=1, . . . , N2), 247-y (y=. . . , N3) and 249-z (z=1, . . . , N4). Optionally, the clock signal from the clock 258 is passed through a divide-by-N module 259 before the clock signal is received by the time delay modules 223, 225 and 227.

Figure 24:
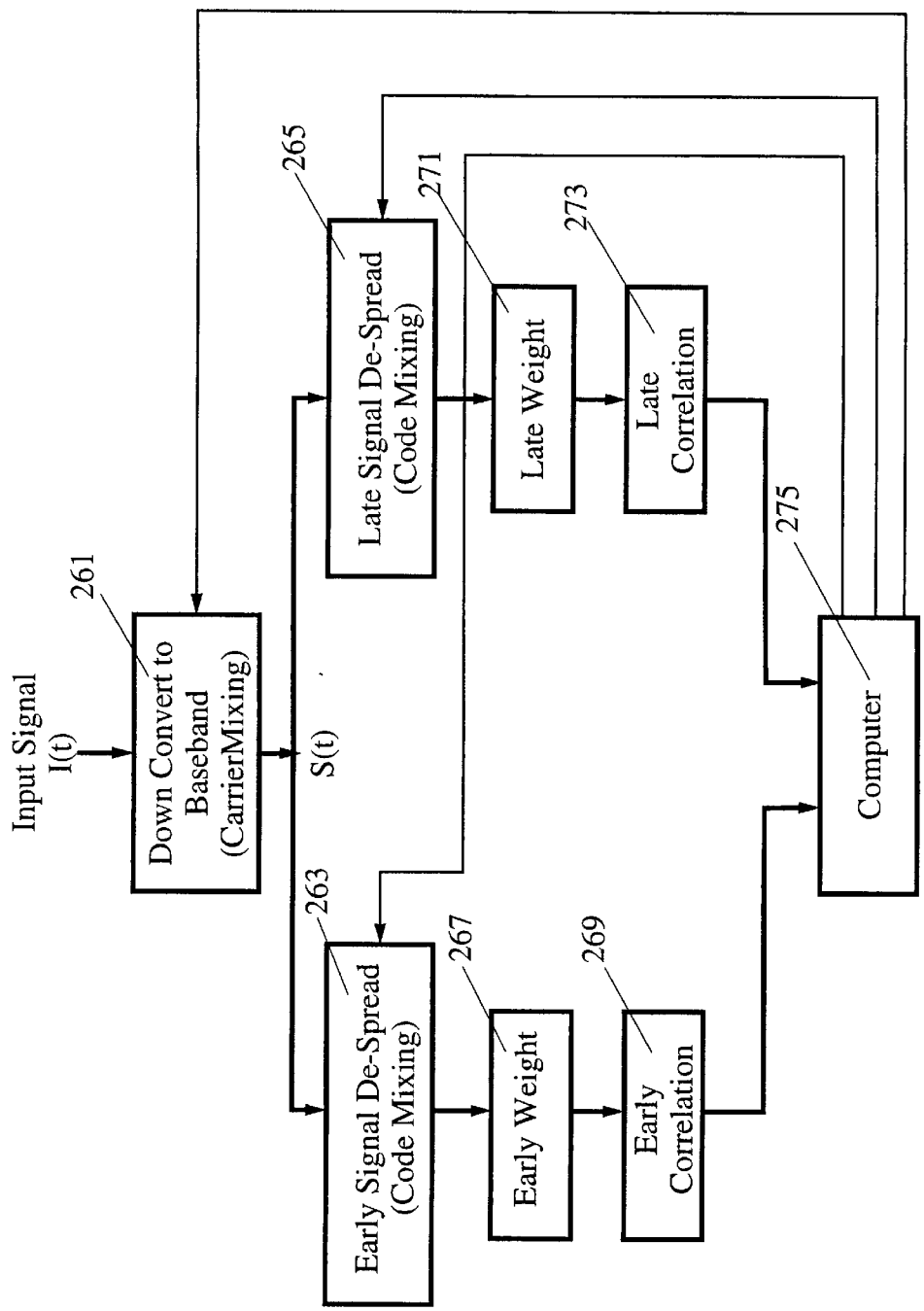

FIG. 24 illustrates a sixth, and more general, implementation of the apparatus. An incoming signal I(t) is downconverted from an intermediate frequency to a baseband signal s(t), using carrier signal mixing in a baseband conversion module 261, in a well known manner. The incoming digital signal s(t) is despread, using code phase mixing to form an early signal product $s(t)S_d(t+\tau-t_E)$ in an early signal despread module 263, and using code phase mixing to form a late signal product $s(t)S_d(t+\tau-t_L)$ in a late signal despread module 265. An early weighting function w(t;E;qE) is combined multiplicatively with the early signal product to form a weighted early signal product $w(t+\tau-t_E;E;qE)s(t)S_d(t+\tau-t_E)$ in an early weighting module 267, and a weighted early signal correlation is formed in an early correlator 269. A late weighting function w(t;L;qL) is combined multiplicatively with the late signal product to form a weighted late signal product $w(t+\tau-t_L;L;qL)s(t)S_d(t+\tau-t_L)$ in a late weighting module 271, and a weighted late signal correlation is formed in a late correlator 273. The early signal autocorrelation and late signal autocorrelation are received by a computer 275 that forms the difference signal $\Delta s_{E-L}(t_n)$ and determines the direction the time shift variable t should move to drive the system toward the zero crossing or tracking point. The time shift adjustment information is fed back to the early and late signal despread modules 263 and 265, for use in forming an adjusted early signal product and a late signal product, and is fed back to the baseband conversion module 261.

The approach developed here is applicable to analysis of any incoming digital signal that has been transmitted using a code division multiple access (CDMA) format, in which the underlying signal is a known pseudo-random code and the time of arrival of the direct signal (with multipath signals absent) is unknown. The source of the incoming digital signal may be a satellite-based or a ground-based signal source, with fixed location or variable location relative to the observer.

A conventional approach to multipath signal evaluation has at most a single degree of freedom, the early-late correlation spacing $\Delta t_{L-E}$, such as $\Delta t_{L-E} \leq 0.3 \Delta \tau_{chip}$, and in any event $\Delta t_{L-E} \leq \Delta \tau_{chip}$. The invention disclosed here allows at least three degrees of freedom, the early-late correlation spacing $\Delta t_{L-E}$ (which is now expanded to the range $0 < \Delta t_{L-E} \leq 2\Delta \tau_{chip}$), the choice of an early correlation weighting function w(t;E;qE) and the choice of a late correlation weighting function w(t;L;qL). The invention thus provides greater degrees of freedom in suppressing the effects of an extant multipath signal.

The phrase "autocorrelation function" is used herein to refer to a sum or integral over a collection of time values of a digital signal product $w(t+\tau;q)s(t)S_d(t+\tau)$, where the digital composite signal s(t) includes the digital direct signal $S_d(t)$ and, possibly, one or more multipath signals $S_m(t;\Delta t_m)$.

I claim:

1. A method of formation of an autocorrelation difference function of an incoming signal that reduces the effects of presence of a multipath signal in the incoming signal, the method comprising the steps of:

receiving an incoming digital signal s(t) that can vary with time t and that has a digital signal bit period with a selected length $\Delta \tau_{chip}$;

forming a signal product $s(t)S_d(t+\tau)w(t+\tau;q)$, where $S_d(t)$ is a selected reference signal, w(t;q) is a selected, non-constant weighting signal that depends upon one or more selected parameters q, and $\tau$ is a selected time shift value;

forming a first autocorrelation function $AC(\tau;q)$ of the incoming signal s(t) by integration or summation of the signal product over a selected time interval that includes a time interval defined by $t1 \leq t \leq t2$, where t1 and t2 are selected time values that satisfy a relation $t2-t1=\Delta \tau_{chip}$;

forming a second autocorrelation function $AC(\tau;E;q)$ that is a replica of the autocorrelation function $AC(\tau;q)$ but that is translated to the left along the $\tau$-axis by a first selected time shift value $\Delta t_{P-E}$;

forming a third autocorrelation function $AC(\tau;L;q)$ that is a replica of the autocorrelation function $AC(\tau;q)$ but that is translated to the right along the $\tau$-axis by a second selected time shift value $\Delta t_{L-P}$, where $\Delta t_{P-E} + \Delta t_{L-P} < 2\Delta \tau_{chip}$;

forming an autocorrelation difference function $\Delta AC(\tau;q) = AC(\tau;E;q) - AC(\tau;L;q)$;

determining at least one value to of the time shift variable $\tau$ at which the autocorrelation difference function $\Delta AC(\tau;q)$ changes sign; and interpreting the time value $t=t_0$ as an estimate of the time at which a signal, which is substantially free of the presence of a multipath signal, was received.

2. The method of claim 1, further comprising the step of selecting said weighting function w(t;q) to be a notch function.

3. The method of claim 1, further comprising the step of selecting said weighting function w(t;q) to be an anti-notch function.

4. The method of claim 1, further comprising the step of selecting said weighting function w(t;q) to be a step function with Q distinct, non-zero step function amplitudes, where Q is a selected integer>1.

5. The method of claim 1, further comprising the step of selecting said weighting function w(t;q) to have at least one positive value and at least one negative value.

6. The method of claim 1, further comprising the step of selecting said first selected time shift value $\Delta t_{P-E}$ and said second selected time shift value $\Delta t_{L-P}$ to be substantially equal to each other.

7. The method of claim 1, further comprising the step of selecting the sum of said first selected time shift value and said second selected time shift value to satisfy $\Delta t_{P-E} + \Delta t_{L-P} \leq 0.3 \Delta \tau_{chip}$.

8. Apparatus for formation of an autocorrelation difference function of an incoming signal that reduces the effects of presence of a multipath signal in the incoming signal, the apparatus comprising:

a signal antenna that receives an incoming digital signal s(t) that can vary with time t;

a signal receiver/processor, including a computer, that receives the incoming signal s(t) from the signal antenna, that forms a signal product $s(t)S_d(t+\tau)w(t+\tau;q)$, where $S_d(t)$ is a selected reference signal, w(t;q) is a selected, non-constant weighting signal that depends upon one or more parameters q, and $\tau$ is a selected time shift, and that is programmed to:

(i) form a first autocorrelation function $AC(\tau;q)$ of the incoming signal s(t) by integration or summation of the signal product over a selected time interval that includes a time interval defined by $t1 \leq t \leq t2$, where t1 and t2 are selected time values that satisfy a relation $t2-t1=\Delta \tau_{chip}$;

(ii) form a second autocorrelation function $AC(\tau;E;q)$ that is a replica of the autocorrelation function $AC(\tau;q)$ but that is translated to the left along the $\tau$-axis by a first selected time shift value $\Delta t_{P-E}$;

(iii) form a third autocorrelation function $AC(t;L;q)$ that is a replica of the autocorrelation function $AC(\tau;q)$ but that is translated to the right along the $\tau$-axis by a second selected time shift value $\Delta t_{L-P}$, where $\Delta t_{P-E} + \Delta t_{L-P} < 2\Delta \tau_{chip}$;

(iv) form an autocorrelation difference function $\Delta AC(\tau;q) = AC(\tau;E;q) - AC(\tau;L;q)$;

(v) determine at least one value to of the time shift variable $\tau$ at which the autocorrelation difference function $\Delta AC(\tau;q)$ changes sign; and (vi) use the time value $t=t_0$ to estimate the time at which a signal, which is substantially free of the presence of a multipath signal, was received at the signal antenna.

9. The apparatus of claim 8, wherein said weighting function w(t;q) used by said signal receiver/processor to form said signal product is selected to be a notch function.

10. The apparatus of claim 8, wherein said weighting function w(t;q) used by said signal receiver/processor to form said signal product is selected to be an anti-notch function.

11. The apparatus of claim 8, wherein said weighting function w(t;q) used by said signal receiver/processor has at least one positive value and has at least one negative value.

12. The apparatus of claim 8, wherein said weighting function w(t;q) is selected to be a step function with Q distinct step function amplitudes, where Q is a selected integer$\geq 1$.

13. The apparatus of claim 8, wherein said first selected time shift value $\Delta t_{P-E}$ and said second selected time shift value $\Delta t_{L-P}$ are substantially equal to each other.

14. The apparatus of claim 8, wherein the sum of said first time shift value and said second time shift value satisfy $\Delta t_{P-E} + \Delta t_{L-P} \leq 0.3 \Delta \tau_{chip}$.

15. A method of formation of an autocorrelation difference function of an incoming signal that reduces the effects of presence of a multipath signal in the incoming signal, the method comprising the steps of:

receiving an incoming digital signal s(t) that can vary with time t and that has a digital signal bit period with a selected length $\Delta\tau_{chip}$;

forming a first signal product $s(t)S_d(t+\tau)w(t+\tau;E;qE)$, where $S_d(t)$ is a selected reference signal, $w(t;E;qE)$ is a first selected, non-constant weighting signal that depends upon one or more selected parameters qE, and $\tau$ is a selected time shift value;

forming a second signal product $s(t)S_d(t+\tau)w(t+\tau;L;qL)$, where $w(t;L;qL)$ is a second selected, non-constant weighting signal that depends upon one or more selected parameters qL;

forming a first autocorrelation function $AC(\tau;E;qE)$ of the incoming signal s(t) by integration or summation of the first signal product over a selected time interval that includes a time interval defined by $t1 \leq t \leq t2$, where t1 and t2 are selected time values that satisfy a relation $t2-t1=\Delta\tau_{chip}$;

forming a second autocorrelation function $AC(\tau;L;qL)$ of the incoming signal by integration or summation of the second signal product over the selected time interval, where the first and second autocorrelation functions $AC(\tau;E;qE)$ and $AC(\tau;L;qL)$ are formed with a selected time shift difference $\Delta t_{L-E}$ satisfies $\Delta t_{L-E} < 2\Delta\tau_{chip}$;

forming an autocorrelation difference function $\Delta AC(\tau;qE;qL)=AC(\tau;E;qE)-AC(\tau;L;qL)$;

determining at least one value to of the time shift variable $\tau$ at which the autocorrelation difference function $\Delta AC(\tau;qE;qL)$ changes sign; and interpreting the time value $t=t_0$ as an estimate of the time at which a signal, which is substantially free of the presence of a multipath signal, was received.

16. The method of claim 15, further comprising the step of selecting said weighting function w(t;q) to be a notch function.

17. The method of claim 15, further comprising the step of selecting said weighting function w(t;q) to be an anti-notch function.

18. The method of claim 15, further comprising the step of selecting said weighting function w(t;q) to be a step function with Q distinct, non-zero step function amplitudes, where Q is a selected integer$\geq 1$.

19. The method of claim 15, further comprising the step of selecting at least one of said weighting functions w(t;E;qE) and w(t;L;qL) to have at least one positive value and at least one negative value.

20. The method of claim 15, further comprising the step of selecting said time shift difference to satisfy $\Delta t_{L-E} \leq 0.3 \Delta\tau_{chip}$.

21. Apparatus for formation of an autocorrelation difference function of an incoming signal that reduces the effects of presence of a multipath signal in the incoming signal, the apparatus comprising:

a signal antenna that receives an incoming digital signal s(t) that can vary with time t and that has a digital signal bit period with a selected length $\Delta\tau_{chip}$;

a signal receiver/processor, including a computer, that receives the incoming signal s(t) from the signal antenna and that is programmed to:

(i) form a first signal product $s(t)S_d(t+\tau)w(t+\tau;E;qE)$, where $S_d(t)$ is a selected reference signal, $w(t;E;qE)$ is a first selected, non-constant weighting signal that depends upon one or more selected parameters qE, and $\tau$ is a selected time shift value;

(ii) form a second signal product $s(t)S_d(t+\tau)w(t+\tau;L;qL)$, where $w(t;L;qL)$ is a second selected, non-constant weighting signal that depends upon one or more selected parameters qL;

(iii) form a first autocorrelation function $AC(\tau;E;qE)$ of the incoming signal by integration or summation of the first signal product over a selected time interval that includes a time interval defined by $t1 \leq t \leq t2$, where t1 and t2 are selected time values that satisfy a relation $t2-t1=\Delta\tau_{chip}$;

(iv) form a second autocorrelation function $AC(\tau;L;qL)$ of the incoming signal by integration or summation of the second signal product over the selected time interval, where the first and second autocorrelation functions $AC(\tau;E;qE)$ and $AC(\tau;L;qL)$ are formed with a selected time shift difference $\Delta t_{L-E}$ that satisfies $\Delta t_{L-E} < 2\Delta\tau_{chip}$;

(v) form an autocorrelation difference function $\Delta AC(\tau;qE;qL)=AC(\tau;E;qE)-AC(\tau;L;qL)$;

(vi) determine at least one value $t_0$ of the time shift variable $\tau$ at which the autocorrelation difference function $\Delta AC(\tau;qE;qL)$ changes sign; and (vii) use the time value $t=t_0$ to estimate the time at which a signal, which is substantially free of the presence of a multipath signal, was received at the signal antenna.

22. The apparatus of claim 21, wherein said weighting function w(t;q) used by said signal receiver/processor to form said signal product is selected to be a notch function.

23. The apparatus of claim 21, wherein said weighting function w(t;q) used by said signal receiver/processor to form said signal product is selected to be an anti-notch function.

24. The apparatus of claim 21, wherein said weighting function w(t;q) is selected to be a step function with Q distinct step function amplitudes, where Q is a selected integer$\geq 1$.

25. The apparatus of claim 21, wherein at least one of said weighting functions w(t;E;qE) and w(t;L;qL) has at least one positive value and has at least one negative value.

26. The apparatus of claim 21, wherein said time shift difference $\Delta t_{L-E}$ satisfies $\Delta t_{L-E} \leq 0.3 \Delta\tau_{chip}$.

27. A method of formation of an autocorrelation difference function of an incoming signal that reduces the effects of presence of a multipath signal in the incoming signal, the method comprising the steps of:

receiving an incoming digital signal s(t) that can vary with time t and that has a digital signal bit period with a selected length $\Delta\tau_{chip}$;

sampling the incoming signal non-uniformly over a sequence of selected time intervals $J_m = \{t | t1+m(t2-t1) \leq t \leq t1+(m+1)(t2-t1)\}$ (m=0, 1, 2, ... ) at a sequence of times $t=t_n$ (n 1, 2, ..., N), where each sample time $t_n$ lies in a selected subinterval $J'_m$ of $J_m$ defined by $J'_m = \{t | t1'+m(t2-t1) \leq t \leq t2'+m(t2-t1)\}$, where $t1 < t1' < t2' < t2$, where t1 and t2 are selected time values that satisfy a relation $t2-t1=\Delta\tau_{chip}$;

forming a sequence of signal products $s(t_n)S_d(t_n+\tau)$, where $S_d(t)$ is a selected reference signal and $\tau$ is a selected time shift value;

forming an autocorrelation function $AC(\tau;q)$ of the incoming signal by summation of the signal products $s(t_n)S_d(t_n+\tau)$ (n=1, 2, ..., N) over a selected time interval that includes at least one time interval $J_m$;

forming a second autocorrelation function $AC(\tau;E;q)$ that is a replica of the autocorrelation function $AC(\tau;q)$ but that is translated to the left along the t-axis by a positive time shift value $\Delta t_{P-E}$;

forming a third autocorrelation function AC(τ;L;q) that is a replica of the autocorrelation function AC(τ;q) but that is translated to the right along the t-axis by a positive time shift value $\Delta t_{L-P}$, where $\Delta t_{P-E}+\Delta t_{L-P}<2\Delta\tau_{chip}$;

forming an autocorrelation difference function $\Delta AC(\tau;q) = AC(\tau;E;qE) - AC(\tau;L;qL)$;

determining at least one value to of the time shift variable τ at which the autocorrelation difference function ΔAC(τ;q) changes sign; and using the time value $t=t_0$ to estimate the time at which a signal, which is substantially free of the presence of a multipath signal, was received at the signal antenna.

28. Apparatus for formation of an autocorrelation difference function of an incoming signal that reduces the effects of presence of a multipath signal in the incoming signal, the apparatus comprising:

a signal antenna that receives an incoming digital signal s(t) that can vary with time t and that has a digital signal bit period with a selected length $\Delta\tau_{chip}$;

a signal receiver/processor, including a computer, that receives the incoming signal s(t) from the signal antenna and that is programmed to:

(i) sample the incoming signal non-uniformly over a sequence of selected time intervals $J_m = \{t | t1+m(t2-t1) \leq t \leq t1+(m+1)(t2-t1)\}$ (m=0, 1, 2, . . . ) at a sequence of times $t=t_n$ (n 1, 2, . . . , N), where each sample time $t_n$ lies in a selected subinterval $J'_m$ of $J_m$ defined by $J'_m = \{t | t1'+m(t2-t1) \leq t \leq t2'+m(t2-t1)\}$, where t1<t1'<t2'<t2, where t1 and t2 are selected time values that satisfy a relation $t2-t1=\Delta\tau_{chip}$;

(ii) form a sequence of signal products $s(t_n)S_d(t_n+\tau)$, where $S_d(t)$ is a selected reference signal and τ is a selected time shift value;

(iii) form an autocorrelation function AC(τ;q) of the incoming signal by summation of the signal products $s(t_n)S_d(t_n+\tau)$ (n=1, 2, . . . , N) over a selected time interval that includes at least one time interval $J_m$;

(iv) form a second autocorrelation function AC(τ;E;q) that is a replica of the autocorrelation function AC(τ;P;q) but that is translated to the left along the τ-axis by a positive time shift value $\Delta t_{P-E}$;

(v) form a third autocorrelation function AC(τ;L;q) that is a replica of the autocorrelation function AC(τ;P;q) but that is translated to the right along the τ-axis by a positive time shift value $\Delta t_{L-P}$, where $\Delta t_{P-E}+\Delta t_{L-P}<2\Delta\tau_{chip}$;

(vi) form an autocorrelation difference function $\Delta AC(\tau;q) = AC(\tau;E;qE) - AC(\tau;L;qL)$;

(vii) determine at least one value to of the time shift variable τ at which the autocorrelation difference function ΔAC(τ;q) changes sign; and (viii) use the time value $t=t_0$ to estimate the time at which a signal, which is substantially free of the presence of a multipath signal, was received at the signal antenna.

29. A method for accumulating autocorrelation data representing a timing relationship between a first time varying digital signal containing a desired signal and a second time varying digital signal that is a replica of the desired signal, where the desired signal has a digital bit value time interval of selected length $\Delta\tau_{chip}$, the method comprising the steps of:

generating a first weighting signal, having at least two distinct values;

generating a second weighting signal, having at least two distinct values;

mixing the first weighting signal, the first signal and the second signal to generate a first weighted signal;

mixing the second weighting signal, the first signal and the second signal to generate a second weighted signal;

accumulating the first weighted signal over a first predetermined time interval to form a first accumulated weighted signal;

accumulating the second weighted signal over a second predetermined time interval to form a second accumulated weighted signal, where each of the first and the second weighting signals is chosen to de-emphasize the contribution, to the respective first and second accumulated weighted signals, of at least one time interval that does not include and is spaced apart from an estimated time at which the first signal was received; and forming a third accumulated weighted signal that is the difference of the accumulated first weighted signal and the second accumulated weighted signal.

30. The method of claim 29, further comprising the step of shifting said first signal in time relative to said second signal.

31. The method of claim 30, further comprising the step of shifting said first signal to an earlier time relative to said second signal.

32. The method of claim 31, further comprising the step of selecting the magnitude of said shift in time of said first signal relative to said second signal to be greater than $0.5\Delta\tau_{chip}$.

33. The method of claim 30, further comprising the step of shifting said first signal to a later time relative to said second signal.

34. The method of claim 33, further comprising the step of selecting the magnitude of said shift in time of said first signal relative to said second signal to be greater than $0.5\Delta\tau_{chip}$.

35. The method of claim 29, further comprising the steps of:

identifying a transition time at which said second signal makes a transition from a first digital bit value to a second digital bit value; and generating said first weighting signal so that said first weighting signal has non-zero values for a selected time interval that includes the transition time.

36. A method for accumulating autocorrelation data representing a timing relationship between a first time varying digital signal containing a desired signal and a second time varying digital signal that is a replica of the desired signal, where the desired signal has a digital bit value time interval of selected length $\Delta\tau_{chip}$, the method comprising the steps of:

identifying a transition time at which the second signal makes a transition from a first digital bit value to a second digital bit value;

generating a first weighting signal so that the first weighting signal has non-zero values for a selected time interval that includes the transition time.

mixing the first weighting signal, the first signal and the second signal to generate a first weighted signal; and accumulating the first weighted signal.

37. The method of claim 36, further comprising the step of shifting said first signal in time relative to said second signal.

38. The method of claim 37, further comprising the step of shifting said first signal to an earlier time relative to said second signal.

39. The method of claim 38, further comprising the step of selecting the magnitude of said shift in time of said first signal relative to said second signal to be greater than $0.5\Delta\tau_{chip}$.

40. The method of claim 37, further comprising the step of shifting said first signal to a later time relative to said second signal.

41. The method of claim 40, further comprising the step of selecting the magnitude of said shift in time of said first signal relative to said second signal to be greater than $0.5\Delta\tau_{chip}$.

42. Apparatus for accumulating autocorrelation data representing a timing relationship between a first time varying digital signal containing a desired signal and a second time varying digital signal that is a replica of the desired signal, where the desired signal has at least one transition time at which the desired signal makes a transition from a first digital value to a second digital value, the apparatus comprising:

signal mixing means for receiving and mixing the first signal and the second signal to generate a mixed signal; and a signal sampler to sample the mixed signal at each of a sequence of at least two selected sampling times, to accumulate the sampled values of the mixed signal, and to form an accumulated mixed signal, wherein at least one of the sampling times is selected to lie in a neighborhood surrounding a transition time at which the second signal makes a transition from a first digital bit value to a second digital bit value.

43. The apparatus of claim 42, further comprising time shift means for receiving at least one of said first signal and said second signal and for shifting said first signal in time relative to said second signal by a selected time shift $\Delta t1$, wherein said signal mixing means receives and mixes said second signal and said first signal time shifted by $\Delta t1$ to form said mixed signal.

44. The apparatus of claim 43, wherein:

said time shift means also shifts said first signal in time relative to said second signal by a second selected time shift $\Delta t2$, where $\Delta t2$ is different from $\Delta t1$;

said signal mixing means also receives and mixes said second signal and said first signal time shifted by $\Delta t2$ to form a second mixed signal;

said signal sampler also samples the second mixed signal at each of a sequence of at least two selected sampling times, accumulates the sampled values of the second mixed signal, and forms an accumulated second mixed signal; and said apparatus further comprises signal difference means for receiving and forming a difference of said accumulated mixed signal and the accumulated second mixed signal.

* * * * *